United States Patent [19]

Monacos

[11] Patent Number: 5,377,182
[45] Date of Patent: Dec. 27, 1994

[54] NON-BLOCKING CROSSBAR PERMUTATION ENGINE WITH CONSTANT ROUTING LATENCY

[75] Inventor: Steve P. Monacos, Altadena, Calif.

[73] Assignee: The United States of America as represented by the Administrator of the National Aeronautics and Space Administration, Washington, D.C.

[21] Appl. No.: 111,318

[22] Filed: Aug. 18, 1993

[51] Int. Cl.$^5$ ................... H04L 12/56; H04Q 11/04
[52] U.S. Cl. ........................... 370/16; 370/58.3; 370/60; 370/94.1; 340/827, 825.8; 379/221; 379/335
[58] Field of Search ............ 370/16, 54, 56, 58.1, 370/58.2, 58.3, 60, 60.1, 63, 65, 65.5, 94.1; 340/825.02, 825.03, 826, 827, 825.79, 825.8; 379/219, 220, 221, 268, 269, 271, 272, 273, 291, 334, 335; 359/109, 115, 117, 124, 127, 128, 135, 140

[56] References Cited

U.S. PATENT DOCUMENTS

| | | | |
|---|---|---|---|
| 4,327,418 | 4/1982 | Kishi | 364/715 |
| 4,670,871 | 6/1987 | Vaidya | 370/60 |
| 4,731,878 | 3/1988 | Vaidya | 370/60 |
| 4,761,781 | 8/1988 | Calvignac et al. | 370/94.1 |
| 4,771,424 | 9/1988 | Suzuki et al. | 370/94.1 |
| 4,837,855 | 6/1989 | Hajikano et al. | 455/600 |
| 4,939,726 | 7/1990 | Flammer et al. | 370/94.1 |
| 4,955,015 | 9/1990 | Lobjinski et al. | 370/56 |
| 4,970,507 | 11/1990 | Cooperman et al. | 340/825.8 |
| 5,008,887 | 4/1991 | Kafka et al. | 372/6 |
| 5,018,129 | 5/1991 | Netravali et al. | 370/60 |
| 5,022,025 | 6/1991 | Urushidani et al. | 370/60 |
| 5,088,091 | 2/1992 | Schroeder et al. | 370/94.3 |
| 5,093,827 | 3/1992 | Franklin et al. | 370/60 |
| 5,105,424 | 4/1992 | Flaig et al. | 370/94.1 |
| 5,115,433 | 5/1992 | Baran et al. | 370/94.1 |
| 5,125,076 | 6/1992 | Faber et al. | 395/200 |
| 5,132,965 | 7/1992 | Zhang | 370/60 |
| 5,138,615 | 8/1992 | Lamport et al. | 370/94.3 |
| 5,140,585 | 8/1992 | Tomikawa | 370/60.1 |
| 5,142,531 | 8/1992 | Kirby | 370/94.3 |
| 5,144,619 | 9/1992 | Munter | 370/60 |
| 5,151,900 | 9/1992 | Synder et al. | 370/94.3 |
| 5,166,927 | 11/1992 | Iida et al. | 370/60 |
| 5,168,492 | 12/1992 | Beshai et al. | 370/60 |
| 5,179,552 | 1/1993 | Chao | 370/60 |
| 5,179,558 | 1/1993 | Thacker et al. | 370/94.1 |

OTHER PUBLICATIONS

A. Varma, "Optical Switched–Star Networks for Computer–System Interconnection", Photonic Switching II, Springer Verlang, Editors K. Tada–H. S. Hinton, pp. 386–390, 1990.

(List continued on next page.)

*Primary Examiner*—Alpus H. Hsu
*Attorney, Agent, or Firm*—John H. Kusmiss; Thomas H. Jones; Guy M. Miller

[57] ABSTRACT

The invention is embodied in an N×N crossbar for routing packets from a set of N input ports to a set of N output ports, each packet having a header identifying one of the output ports as its destination, including a plurality of individual links which carry individual packets, each link having a link input end and a link output end, a plurality of switches, each of the switches having at least top and bottom switch inputs connected to a corresponding pair of the link output ends and top and bottom switch outputs connected to a corresponding pair of link input ends, whereby each switch is connected to four different links, each of the switches having an exchange state which routes packets from the top and bottom switch inputs to the bottom and top switch outputs, respectively, and a bypass state which routes packets from the top and bottom switch inputs to the top and bottom switch outputs, respectively, a plurality of individual controller devices governing respective ones of the switches for sensing from a header of a packet at each switch input the identity of the destination output port of the packet and selecting one of the exchange and bypass states in accordance with the identity of the destination output port and in accordance with the location of the corresponding switch relative to the destination output port.

27 Claims, 16 Drawing Sheets

OTHER PUBLICATIONS

H. S. Hinton, "Architectural Considerations for Photonic Switching networks", IEEE J. on Sel Areas in Comm., vol. 6, pp. 1209–1226, 1988.

A. A. Sawchuk, B. K. Jenkins, C. S. Raghavendra, and A. Varma, "Optical Crossbar Networks", IEEE Comp., vol. 20 No. 6, pp. 50–60, 1987.

L. N. Bhuyan, "Interconnection Networks for Parallel and Distributed Processing", IEEE Comp., vol. 20, No. 6, pp. 9–12, 1987.

G. F. Lev, N. Pippenger, and L. G. Valiant, "A Fast Parallel Algorithm for Routing in Permutation Networks", IEEE Trans. on Comp., vol. C-30, pp. 93–100, 1981.

C. L. Wu, and T. Y. Feng, "The University of the Shuffle—Exchange Network", IEEE Trans. on Comp., vol. C-30, pp. 324–332, 1981.

D. Nassimi, and S. Sahni, "A Self-Routing Benes Network and Parallel Permutation Algorithms", IEEE Trans. on Comp., vol. C-30, pp. 332–340, 1981.

T. J. Cloonan, and A. L. Lentine, "Self-routing crossbar packet switch employing free-space optics for chip-to-chip interconnections", App. Opt., vol. 20, pp. 3721–3733, 1991.

K. E. Batcher, "Sorting Networks and their applications," Integrated Broadband Networks, Artech House Inc., 1991.

T. T. Lee, "Nonblocking Copy Networks for Multicase Packet Switching" IEEE J. on Sel. Areas in Comm., vol. 6, No. 9, pp. 1455–1467, 1988.

P. Newman, "ATM Technology for Corporate Networks," IEEE Comm., pp. 90–101, Apr. 1992.

C. T. Lea, "Multi-Log2N Self-Routing Networks and Their Applications in High Speed Electronic and Photonic Swicthing Systems," IEEE InFOCOM, pp. 877–886, Apr. 1989.

J. Shamir, and H. J. Caulfield, "High-efficiency rapidly programmable optical interconnections", App. Opt., vol. 26, pp. 1032–1047, 1987.

M. Johnson, M. R. Surette, and J. Shamir, "Optical interconnection network using polarization based ferroelectric liquid crystal gates", App. Opt., vol. 27, pp. 1727–1733, 1988.

J. R. Sauer, "An Optoelectronic Multi-Gb/sPacket Switching Network," OCS Technical Report 89-06, Feb. 1989.

S. P. Monacos, "A Scalable Wrap Around Network with Deflection Routing," manuscript currently in progress.

N. F. Maxemchuk, "Comparison of Deflection and Store-and-Forward Techniques in the Manhatten Street and Shuffle-Exhange Networks" IEEE GlobeCOM, pp. 800–809, 1989.

E. Yamada and M. Nakazawa, "Automatic Intensity Control of an Optical Transmission Line Using Enhanced Gain Saturation in Cascaded Optical Amplifiers," IEEE J. of Quant. Elect., vol. 27, No. 146–151, Jan. 1991.

W. I. Way, T. H. Wu, A. Y. Yan, and C. Lin, "Optical Power Limiting Amplifier and its Applications in an SONET Self-Healing Ring Network" J. Lightwave Tech., vol. 10, No. 2, pp. 206–214, Feb. 1992.

M. Janson, L. Lundgren, A. C. Morner, M. Rask, B. Stoltz, M. Gustavsson, and L. Thylen "Monolithically Integrated 2X2 InGaAsP/InP Laser Amplifier Gate Switch Arrays," ECOC '91, pp. 1–4, 1991.

A. A. Sawchuk et al., "Dynamic Optical Interconnections for Parallel Processors", Laser App. in Sci. and Eng., SPIE 625, pp. 143–153, Jan. 1986.

C. W. Stirk et al., "Optical Implementation of the compare-and-exchange operation for application in symbolic computation", Proc. Soc. Photo-Opt. Instrum. Eng. 754, 1987.

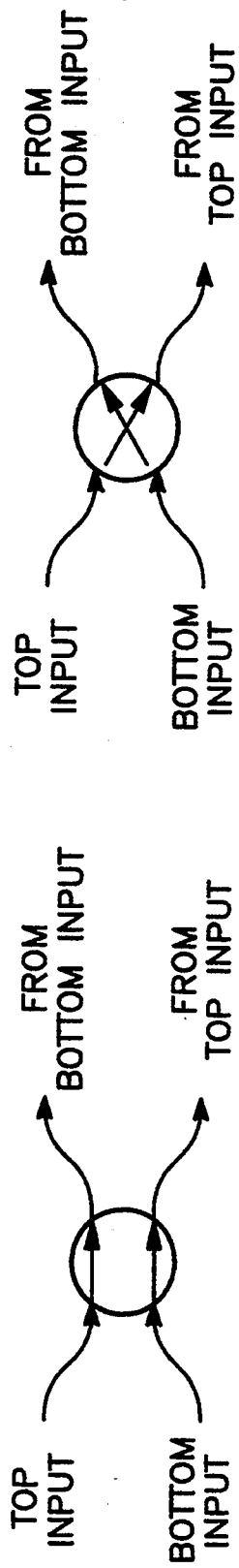
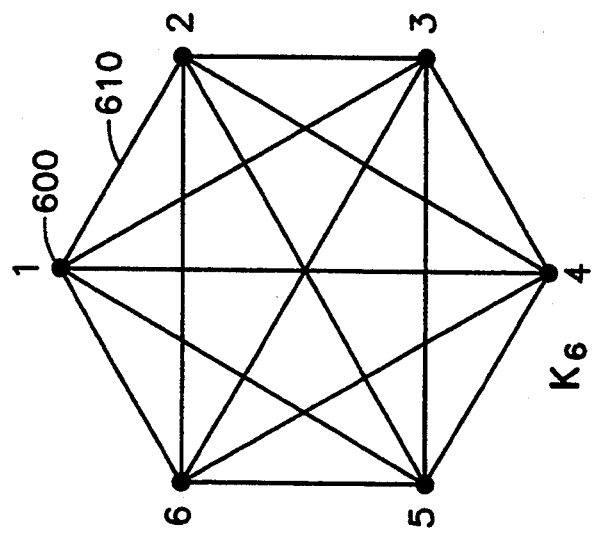
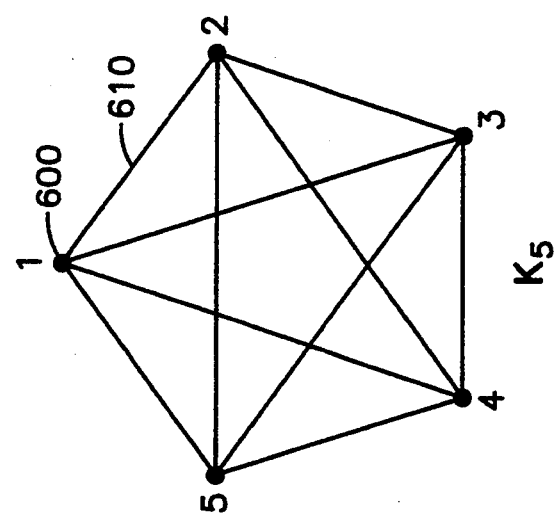
FIG. 5A  BYPASS STATE
FIG. 5B  EXCHANGE STATE
FIG. 6A  $K_5$
FIG. 6B  $K_6$

|   | A | B | C | D | E | F | G |
|---|---|---|---|---|---|---|---|
| 1 | 4 | 4 | 4 | 4 | 4 | 6 | 6 |
| 2 | 3 | 3 | 3 | 3 | 5 | 5 | 5 |
| 3 | 1 | 1 | 1 | 6 | 6 | 4 | 4 |
| 4 | 2 | 2 | 6 | 3 | 3 | 3 | 3 |
| 5 | 6 | 6 | 2 | 5 | 5 | 2 | 2 |
| 6 | 5 | 5 | 5 | 2 | 1 | 1 | 1 |

FIG. 7A

|   | A | B | C | D | E | F | G |
|---|---|---|---|---|---|---|---|
| 1 | 6 | 6 | 6 | 6 | 6 | 6 | 6 |
| 2 | 1 | 1 | 2 | 2 | 4 | 5 | 5 |
| 3 | 2 | 2 | 2 | 4 | 4 | 4 | 4 |
| 4 | 3 | 3 | 4 | 1 | 2 | 3 | 3 |
| 5 | 4 | 4 | 5 | 3 | 3 | 2 | 2 |
| 6 | 5 | 5 | 5 | 5 | 3 | 1 | 1 |

FIG. 7B

|   | A | B | C | D | E | F | G |
|---|---|---|---|---|---|---|---|
| 1 | 2 | 2 | 2 | 4 | 4 | 6 | 6 |
| 2 | 3 | 3 | 4 | 2 | 6 | 5 | 5 |
| 3 | 4 | 4 | 2 | 6 | 4 | 4 | 4 |
| 4 | 5 | 5 | 6 | 3 | 2 | 3 | 3 |
| 5 | 6 | 6 | 5 | 5 | 5 | 2 | 2 |
| 6 | 1 | 1 | 1 | 1 | 1 | 1 | 1 |

FIG. 7C

|   | A | B | C | D | E | F | G |
|---|---|---|---|---|---|---|---|
| 1 | 6 | 6 | 6 | 6 | 6 | 6 | 6 |
| 2 | 1 | 1 | 5 | 5 | 5 | 5 | 5 |
| 3 | 5 | 5 | 1 | 2 | 2 | 4 | 4 |
| 4 | 2 | 2 | 2 | 4 | 4 | 3 | 3 |
| 5 | 4 | 4 | 3 | 3 | 3 | 2 | 2 |
| 6 | 3 | 3 | 4 | 4 | 1 | 1 | 1 |

FIG. 7D

|   | A | B | C | D | E | F | G |
|---|---|---|---|---|---|---|---|
| 1 | 3 | 3 | 3 | 5 | 5 | 6 | 6 |
| 2 | 1 | 1 | 5 | 3 | 6 | 5 | 5 |
| 3 | 5 | 5 | 3 | 6 | 4 | 4 | 4 |
| 4 | 6 | 6 | 6 | 1 | 3 | 3 | 3 |
| 5 | 2 | 2 | 4 | 4 | 2 | 2 | 2 |
| 6 | 4 | 4 | 2 | 2 | 1 | 1 | 1 |

FIG. 7E

|   | A | B | C | D | E | F | G |
|---|---|---|---|---|---|---|---|
| 1 | 6 | 6 | 6 | 6 | 6 | 6 | 6 |
| 2 | 5 | 5 | 5 | 5 | 5 | 5 | 5 |
| 3 | 4 | 4 | 4 | 4 | 4 | 4 | 4 |
| 4 | 3 | 3 | 3 | 3 | 3 | 3 | 3 |
| 5 | 2 | 2 | 2 | 2 | 2 | 2 | 2 |
| 6 | 1 | 1 | 1 | 1 | 1 | 1 | 1 |

|   | A | B | C | D | E | F |
|---|---|---|---|---|---|---|
| 1 | 4 | 4 | 4 | 4 | – | 5 |
| 2 | – | – | – | – | 4 | 4 |
| 3 | – | – | – | – | – | 3 |
| 4 | – | – | – | – | – | 2 |
| 5 | – | – | – | – | – | 1 |

FIG. 8B

|   | A | B | C | D | E | F |
|---|---|---|---|---|---|---|
| 1 | 4 | 4 | 4 | 4 | 5 | 5 |
| 2 | 1 | – | 5 | 5 | 4 | 4 |
| 3 | – | 5 | – | – | – | 3 |
| 4 | 5 | – | – | – | – | 2 |
| 5 | – | – | – | – | – | 1 |

FIG. 8C

|   | A | B | C | D | E | F |
|---|---|---|---|---|---|---|
| 1 | 4 | 4 | 4 | 4 | 4 | 5 |
| 2 | 1 | 1 | 5 | 5 | 5 | 4 |
| 3 | – | 5 | 1 | – | – | 3 |
| 4 | 5 | – | – | 1 | – | 2 |
| 5 | – | – | – | – | 1 | 1 |

FIG. 8D

|   | A | B | C | D | E | F |
|---|---|---|---|---|---|---|
| 1 | 4 | 4 | 4 | 4 | 4 | 5 |
| 2 | 1 | 1 | 5 | 5 | 5 | 4 |
| 3 | 3 | 5 | 1 | – | 3 | 3 |
| 4 | 5 | 3 | – | 1 | – | 2 |
| 5 | – | – | 3 | 3 | 1 | 1 |

FIG. 8E

|   | A | B | C | D | E | F |
|---|---|---|---|---|---|---|
| 1 | 4 | 4 | 4 | 4 | 4 | 5 |
| 2 | 1 | 1 | 5 | 5 | 5 | 4 |
| 3 | 3 | 5 | 1 | 2 | 2 | 3 |
| 4 | 5 | 3 | 2 | 1 | 3 | 2 |
| 5 | 2 | 2 | 3 | 3 | 1 | 1 |

FIG. 9A

|   | A | B | C | D | E | F | G |   |
|---|---|---|---|---|---|---|---|---|
| 1 | 1 | 1 | 1 | 3 | 1 | 1 | 1 | 6 |
| 2 | 1 | 1 | 3 | 1 | 1 | 1 | 1 | 5 |
| 3 | 1 | 3 | 1 | 1 | 1 | 1 | 1 | 4 |
| 4 | 3 | 1 | 1 | 1 | 1 | 1 | 3 | 3 |
| 5 | 1 | 1 | 1 | 1 | 1 | 3 | 1 | 2 |
| 6 | 1 | 1 | 1 | 1 | 3 | 1 | 1 | 1 |

FIG. 9B

|   | A | B | C | D | E | F | G |   |
|---|---|---|---|---|---|---|---|---|
| 1 | 1 | 1 | 1 | 3 | 1 | 1 | 1 | 6 |
| 2 | 1 | 2 | 2 | 1 | 1 | 1 | 1 | 5 |
| 3 | 1 | 2 | 1 | 1 | 2 | 1 | 1 | 4 |
| 4 | 3 | 1 | 1 | 1 | 1 | 2 | 3 | 3 |
| 5 | 1 | 1 | 1 | 3 | 1 | 3 | 2 | 2 |
| 6 | 1 | 1 | 1 | 1 | 3 | 1 | 1 | 1 |

FIG. 9C

|   | A | B | C | D | E | F | G |   |
|---|---|---|---|---|---|---|---|---|
| 1 | 6 | 6 | 6 | 6 | 6 | 6 | 6 | 6 |
| 2 | 1 | 1 | 2 | 2 | 1 | 1 | 1 | 5 |
| 3 | 3 | 2 | 2 | 1 | 2 | 1 | 1 | 4 |
| 4 | 3 | 3 | 1 | 1 | 1 | 2 | 3 | 3 |
| 5 | 1 | 1 | 1 | 3 | 1 | 3 | 2 | 2 |
| 6 | 1 | 1 | 1 | 3 | 3 | 1 | 1 | 1 |

FIG. 9D

|   | A | B | C | D | E | F | G |   |
|---|---|---|---|---|---|---|---|---|
| 1 | 6 | 6 | 6 | 6 | 6 | 6 | 6 | 6 |
| 2 | 1 | 2 | 2 | 2 | 1 | 1 | 1 | 5 |
| 3 | 2 | 2 | 3 | 1 | 2 | 4 | 4 | 4 |
| 4 | 3 | 1 | 1 | 1 | 4 | 2 | 3 | 3 |
| 5 | 4 | 1 | 1 | 4 | 3 | 3 | 2 | 2 |
| 6 | 1 | 1 | 1 | 3 | 4 | 1 | 1 | 1 |

FIG. 9E

|   | A | B | C | D | E | F | G |   |
|---|---|---|---|---|---|---|---|---|
| 1 | 6 | 6 | 6 | 6 | 6 | 6 | 6 | 6 |
| 2 | 1 | 1 | 2 | 2 | 5 | 5 | 5 | 5 |
| 3 | 2 | 2 | 5 | 5 | 2 | 4 | 4 | 4 |
| 4 | 3 | 3 | 5 | 1 | 4 | 2 | 3 | 3 |
| 5 | 4 | 5 | 3 | 4 | 3 | 3 | 2 | 2 |
| 6 | 5 | 4 | 4 | 3 | 1 | 1 | 1 | 1 |

FIG. 9F

|   | A | B | C | D | E | F | G |   |
|---|---|---|---|---|---|---|---|---|
| 1 | 6 | 6 | 6 | 6 | 6 | 6 | 6 | 6 |
| 2 | 1 | 1 | 2 | 2 | 5 | 5 | 5 | 5 |
| 3 | 2 | 2 | 5 | 5 | 2 | 4 | 4 | 4 |
| 4 | 3 | 3 | 5 | 1 | 4 | 2 | 3 | 3 |
| 5 | 4 | 5 | 3 | 4 | 3 | 3 | 2 | 2 |
| 6 | 5 | 4 | 4 | 3 | 1 | 1 | 1 | 1 |

|   | A | B | C | D | E | F | G |   |
|---|---|---|---|---|---|---|---|---|
|   | 1 | 5 | 5 | 5 | 5 | 5 | 6 | 6 |
|   | 5 | 1 | 4 | 4 | 4 | 4 | 5 | 5 |
|   | 4 | 4 | 4 | 3 | 3 | 3 | 4 | 4 |
|   | 3 | 3 | 3 | 1 | 3 | 3 | 3 | 3 |
|   | 2 | 2 | 2 | 2 | 2 | 1 | 2 | 2 |
|   | 1 | 1 | 1 | 1 | 1 | 1 | 1 | 1 |
|   | 1 | 2 | 3 | 4 | 5 | 6 |   |   |

FIG. 11A

|   | A | B | C | D | E | F | G |
|---|---|---|---|---|---|---|---|
| 6 | 5 | 5 | 5 | 5 | 3 | 1 | 1 |
| 5 | 5 | 5 | 3 | 3 | 5 | 3 | 2 |
| 4 | 4 | 4 | 3 | 5 | 1 | 2 | 3 |
| 3 | 3 | 3 | 4 | 1 | 4 | 5 | 4 |
| 2 | 2 | 1 | 1 | 2 | 2 | 4 | 5 |
| 1 | 1 | 2 | 2 | 1 | 1 | 1 | 6 |

FIG. 11B

|   | A | B | C | D | E | F | G |
|---|---|---|---|---|---|---|---|
| 6 | 1 | 5 | 5 | 5 | 4 | 4 | 6 |
| 5 | 5 | 5 | 5 | 4 | 5 | 5 | 5 |
| 4 | 4 | 4 | 4 | 2 | 2 | 1 | 4 |
| 3 | 4 | 3 | 2 | 1 | 1 | 2 | 3 |
| 2 | 3 | 2 | 1 | 2 | 2 | 3 | 2 |
| 1 | 2 | 1 | 3 | 3 | 3 | 1 | 1 |
|   | 1 | 2 | 3 | 4 | 5 | 6 |   |

SEQUENCE  1  5  2  4  3

FIG. 11C

|   | A | B | C | D | E | F | G |
|---|---|---|---|---|---|---|---|
| 6 | 4 | 5 | 5 | 5 | 3 | 1 | 1 |
| 5 | 5 | 5 | 3 | 3 | 1 | 3 | 2 |
| 4 | — | 4 | 4 | 5 | 5 | 2 | 3 |
| 3 | 3 | 3 | 1 | 1 | 2 | 5 | 4 |
| 2 | 2 | 2 | 2 | 2 | 4 | 4 | 5 |
| 1 | 1 | 1 | 1 | — | 1 | 1 | 6 |

FIG. 11D

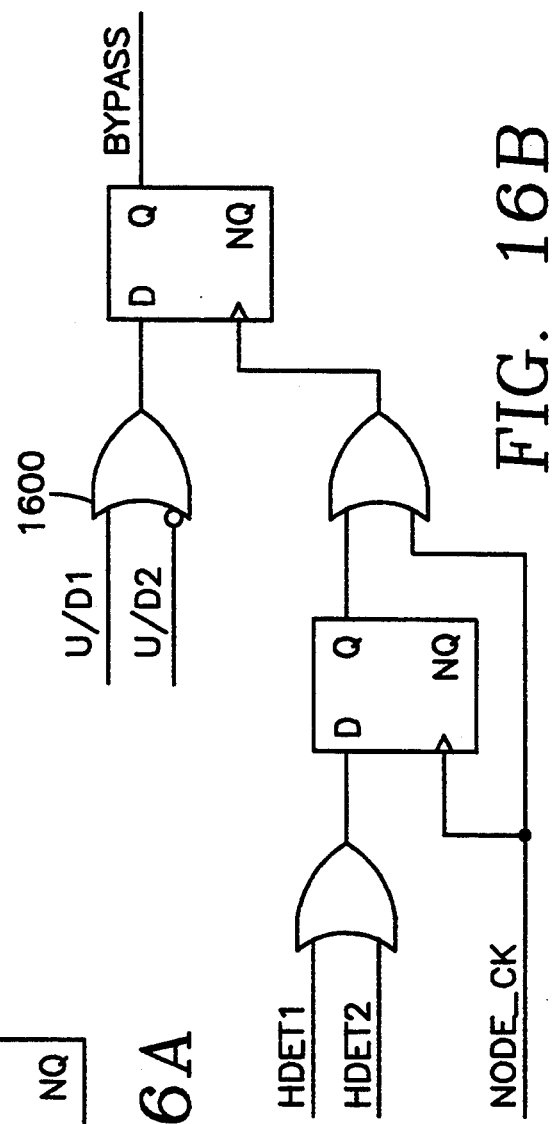
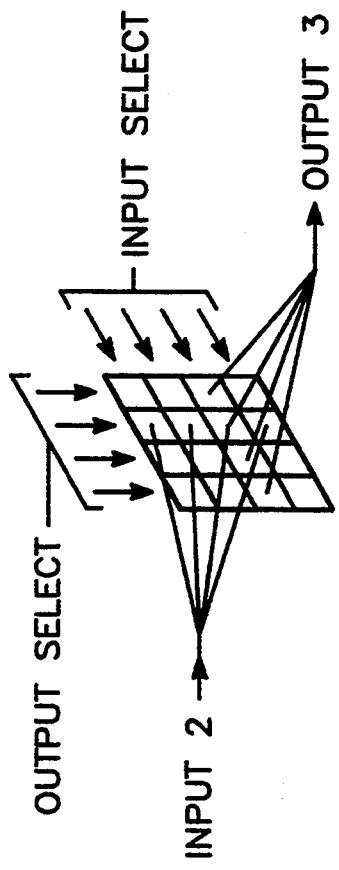
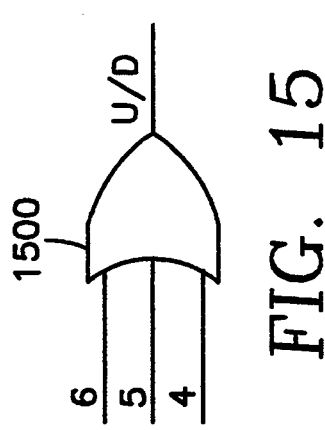
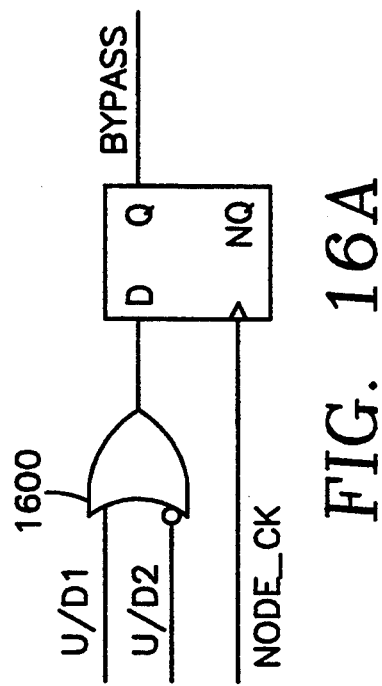
FIG. 15
FIG. 16A
FIG. 16B
FIG. 17

NON-BLOCKING CROSSBAR PERMUTATION ENGINE WITH CONSTANT ROUTING LATENCY

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

1. Technical Field

The invention is related to crossbar switches for application in optical communication networks.

2. Background Art

The current state of crossbar technology often relies on the use of a global electronic controller to route packets through a switching network and resolve packet contention problems. Such a scheme has the drawback of requiring a complicated electronic control mechanism in the data path. This configuration not only constricts switching speed but also the scalability of the crossbar due to the complexity of the controller. A multistage interconnection network (MIN), such as a hypercube or omega/shuffle exchange network, can be used to increase the network size much beyond the number of I/O ports of a given crossbar. A crossbar is a switching matrix in which a connection can be made from any input port to any output port. A MIN configuration is formed by cascading several crossbars to provide an indirect connection between any input of one crossbar to any output of another crossbar.

By defining the crossbars as connection points or nodes, and lines with arrows joining them as links, a directed graph is realized where the arrows on the links designate the direction of data flow. Depending on the interconnection of the crossbars, different MIN topologies such as a hypercube or an omega/shuffle exchange network are realized. Referring to the hypercube topology of FIG. 1, two nodes 100, 110 are joined via a bidirectional link 115 which uses one input and one output port from each node 100, 110. The dimensionality of a given hypercube is just the number of bidirectional links/next neighbor nodes connected to a given node, where the binary address of a next neighbor node differs in only one bit position from that of the given node address. For an n−1 dimension hypercube, each node is an n×n crossbar to accommodate a total of $2^{n-1}$ nodes, where the $n^{th}$ I/O ports of the crossbar are connected to the host device. This situation is illustrated for a 3-dimensional hypercube in FIG. 1.

In contrast to the hypercube topology, a shuffle exchange network of the type illustrated in FIG. 2 is unidirectional and requires only 2×2 crossbars/switches 200, or 2-input/2-output bypass/exchange switches, with data coming into the left side of the network and undergoing a shuffle operation between switch stages 210, 220. Each stage 210, 220 of a k-stage shuffle exchange network, has $2^{k-1}$ 2×2 switches 200 (for a total of $k*2^{k-1}$ switches) with $2^k$ packets incident on the first stage 210. After k switch stages, the $2^k$ packets are reorganized into the desired output positions. FIG. 2 shows a 3-stage (k=3) omega/shuffle exchange network. While these schemes provide scalability of the network, the hypercube topology scales as $2^n$ where n is the number of nodes, while the number of shuffle exchange switches scales as $k*2^k$ for $2^k$ inputs If the hypercube or shuffle exchange network were fully connected and one more host was to be added, an additional $2^n$ nodes or $k*2^{k-1}+2^k$ switches would be needed for these topologies respectively. Such scalability can be very expensive in terms of the additional hardware required in addition to the increased switching latency of another complex controller in the data path.

SUMMARY OF THE DISCLOSURE

The invention is embodied in an N×N crossbar for routing packets from a set of N input ports to a set of N output ports, each packet having a header identifying one of the output ports as its destination. The invention includes plural individual links which carry individual packets, each link having a link input end and a link output end, a plurality of switches, each of the switches having at least top and bottom switch inputs connected to a corresponding pair of the link output ends and top and bottom switch outputs connected to a corresponding pair of link input ends, whereby each switch is connected to four different links. Each of the switches has an exchange state which routes packets from the top and bottom switch inputs to the bottom and top switch outputs, respectively, and a bypass state which routes packets from the top and bottom switch inputs to the top and bottom switch outputs, respectively. A plurality of individual controller devices govern respective ones of the switches by sensing from a header of a packet at each switch input the identity of the destination output port of the packet and selecting one of the exchange and bypass states in accordance with the identity of the destination output port and in accordance with the location of the corresponding switch relative to the destination output port.

In one embodiment, the plurality of individual links are connected between nearest neighbors of the switches, whereby none of the links overlaps any others of the links. In another embodiment, each controller device includes a device for selecting an exchange state whenever the packets at the switch inputs would not be precluded from reaching their destination output ports by setting the switch to the exchange state. In a further embodiment, the N input ports are those of the link input ends not connected to switches and constituting one end of the crossbar and the N output ports are those of the link output ends not connected to switches and constituting another end of the crossbar.

In a preferred embodiment, each controller device includes a device for associating the output ports with a set of consecutive numbers, a device for associating each of the links with the number of the output port in the direct path thereof as a link label. The controller device determines a first value equal to the absolute value of the difference between the link label corresponding to the top switch output and the number of the destination output port of a particular packet at an input port of the switch, and a second value equal to the absolute value of the difference between the link label corresponding to the bottom switch output and the number of the destination output port of the particular packet. A first routing device routes the particular packet to the top switch output if the first value is less than the second value and routes the particular packet to the bottom switch output if the second value is less than the first value. The controller device further includes a second routing device for (I) forbidding a switch bypass state if (a) the packet is at the bottom switch input and if (b) the destination number is greater than the link label corresponding to the bottom switch output and for (II) forbidding a switch bypass state if the packet is at the top switch input and the destination number of less than the link label corresponding to the top switch input.

In a related embodiment, the controller device further includes a device for forbidding the exchange state of the switch if packets at the top and bottom switch inputs cause the first and second routing devices to select the same switch output for both packets contemporaneously.

Preferably, the links are characterized by a uniform delay along the lengths thereof and the switches are characterized by a uniform delay therethrough. The plurality of links form a planar mesh having top and bottom edges, the crossbar further including delay elements each having the same delay as the switches, each delay element connecting a link input end to a link output end at a corresponding edge of the mesh. Each of the links lies along a diagonal path and the switches and the delay elements lie at points of intersection of different diagonal paths.

In accordance with one implementation of the invention, the device for selecting includes a device for comparing the destination output port number of a packet at each of the top and bottom switch inputs with a predetermined set of numbers prescribed for the particular switch and for generating an up signal upon a match and a down signal otherwise for each of the packets and a device for selecting the exchange state unless there are two up signals or two down signals. This implementation further includes a device for holding each of the switches in one of the exchange and bypass states selected by the controller device thereof until an entire packet has traversed the crossbar.

The invention is also embodied in a non-blocking crossbar, including at least a pair of cascaded permutation engines, each of the permutation engines including an N×N crossbar for routing packets from a set of N input ports to a set of N output ports, each packet having a header identifying one of the output ports as its destination. A plurality of individual links carry individual packets, each link having a link input end and a link output end. The invention further includes a plurality of switches, each having at least top and bottom switch inputs connected to a corresponding pair of the link output ends and top and bottom switch outputs connected to a corresponding pair of link input ends, whereby each switch is connected to four different links. Each of the switches has an exchange state which routes packets from the top and bottom switch inputs to the bottom and top switch outputs, respectively, and a bypass state which routes packets from the top and bottom switch inputs to the top and bottom switch outputs, respectively. A plurality of individual controller devices govern respective ones of the switches by sensing from a header of a packet at each switch input the identity of the destination output port of the packet and selecting one of the exchange and bypass states in accordance with the identity of the destination output port and in accordance with the location of the corresponding switch relative to the destination output port. Also, the output ports of one of the permutation engines are connected to respective ones of the input ports of the other of the permutation engines.

BRIEF DESCRIPTION OF THE DRAWINGS

FIGS. 5A and 5B illustrate the function of a 2×2 switch employed in the permutation engines of FIGS. 3 and 4 in the bypass and exchange states, respectively.

FIGS. 6A and 6B are connectivity graphs corresponding to the permutation engines of FIGS. 3 and 4 respectively.

FIGS. 7A, 7B, 7C, 7D, 7E and 7F illustrate routing tables for various examples of non-contending simultaneous packets routed through the six-input permutation engine of FIG. 4, in which the permutation engine input and output ports are labelled on the extreme right and left columns of the tables, respectively, and the destination d of individual packets are identified at each column of links A—G, so that the route of each packet through the mesh is indicated by the locations of the corresponding destination number from left to right in the drawing.

FIGS. 8A, 8B, 8C, 8D and 8E are routing tables similar to those of FIGS. 7A-F, but illustrating different examples of non-simultaneous non-contending sequential packets in the five-input permutation engine of FIG. 3.

FIGS. 9A, 9B, 9C, 9D, 9E and 9F are routing tables like those of FIGS. 8A-E for different examples of non-simultaneous non-contending sequential packets, but for the six-input permutation engine of FIG. 4.

FIGS. 11A and 11B each depict a routing table for a respective one of the pair of six-input cascaded permutation engines of FIG. 10, for an example of the routing of five simultaneous packets, of which FIG. 11A depicts routing in the sorting stage and FIG. 11B depicts routing in the interconnection stage.

FIGS. 11C and 11D each depict a routing table for a respective one of the pair of six-input cascaded permutation engines of FIG. 10, for the example of the sequential routing of five non-simultaneous packets whose order of receipt is indicated by the numbers labelled "sequence" on the left side of FIG. 11C, of which FIG. 11C depicts routing in the sorting stage and FIG. 11D depicts routing in the interconnection stage.

FIG. 15 illustrates an OR gate constituting routing logic employed in the controller circuit of FIG. 12.

FIGS. 16A and 16B illustrate different embodiments of the arbitration logic employed in the controller circuit of FIG. 12.

FIG. 17 illustrates one way of integrating the control and switching functions in the permutation engine of the invention.

DETAILED DESCRIPTION OF THE PREFERRED EMBODIMENTS

Introduction

A strictly non-blocking optical crossbar network topology and distributed routing algorithm is described with the following properties: i) any input can be routed to any output without blocking any remaining input to output connections; ii) constant delay to route any input to any output; iii) a simple distributed routing control mechanism based strictly on the desired destination (i.e. any permutation of destination addresses in time and input position will route to the desired output port); iv) wrap-around queueing capability to handle blocking when two or more packets want to route to the same output port; and v) highly scalable architecture. The crossbar of the invention operates in a bit-synchronous, packet-asynchronous mode (meaning incoming packets need only be reclocked for bit alignment but not packet alignment). The distributed control and switching hardware for this crossbar is simple enough to build using current electronic and/or optical/electrooptic technology. The fundamental building block of the invention is referred to herein as a permutation engine due to its ability to properly sort any permutation of destination addresses at the input ports by the time they reach the output ports.

Overview of the System

The present invention is embodied in a permutation engine which allows for any number of I/O ports, where the number of 2×2 switches is given by n*(n−1)/2, for n inputs. A strictly non-blocking crossbar of the invention consists of m permutation engines resulting in a total of m*(n*(n−1))/2 2×2 switches, where m=n/2 for n even and m=(n+1)/2 for n odd.

Permutation Engine Topology

Figure 1:
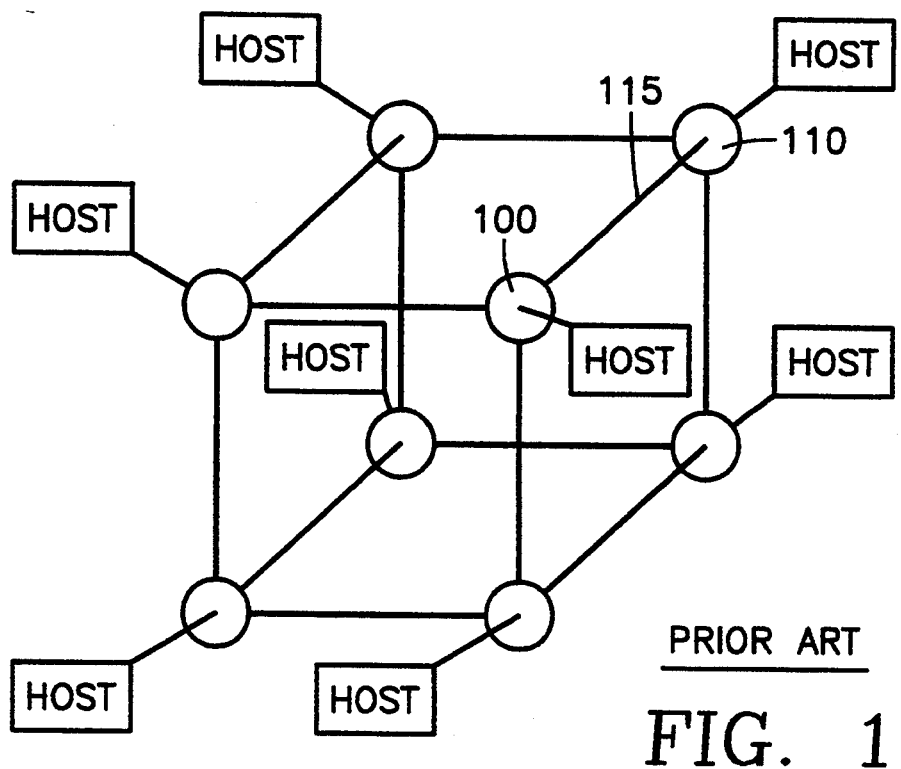
FIG. 1 is a simplified diagram of a three-dimensional hypercube network of the prior art.
Figure 2:
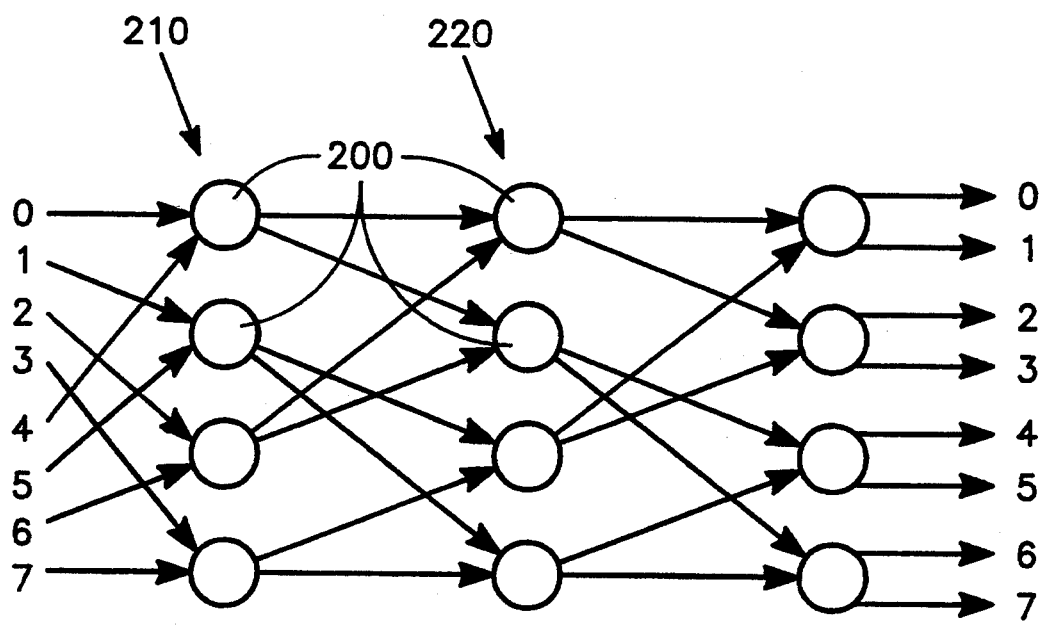
FIG. 2 is a simplified diagram of a three-stage omega/shuffle exchange network of the prior art.
Figure 3:
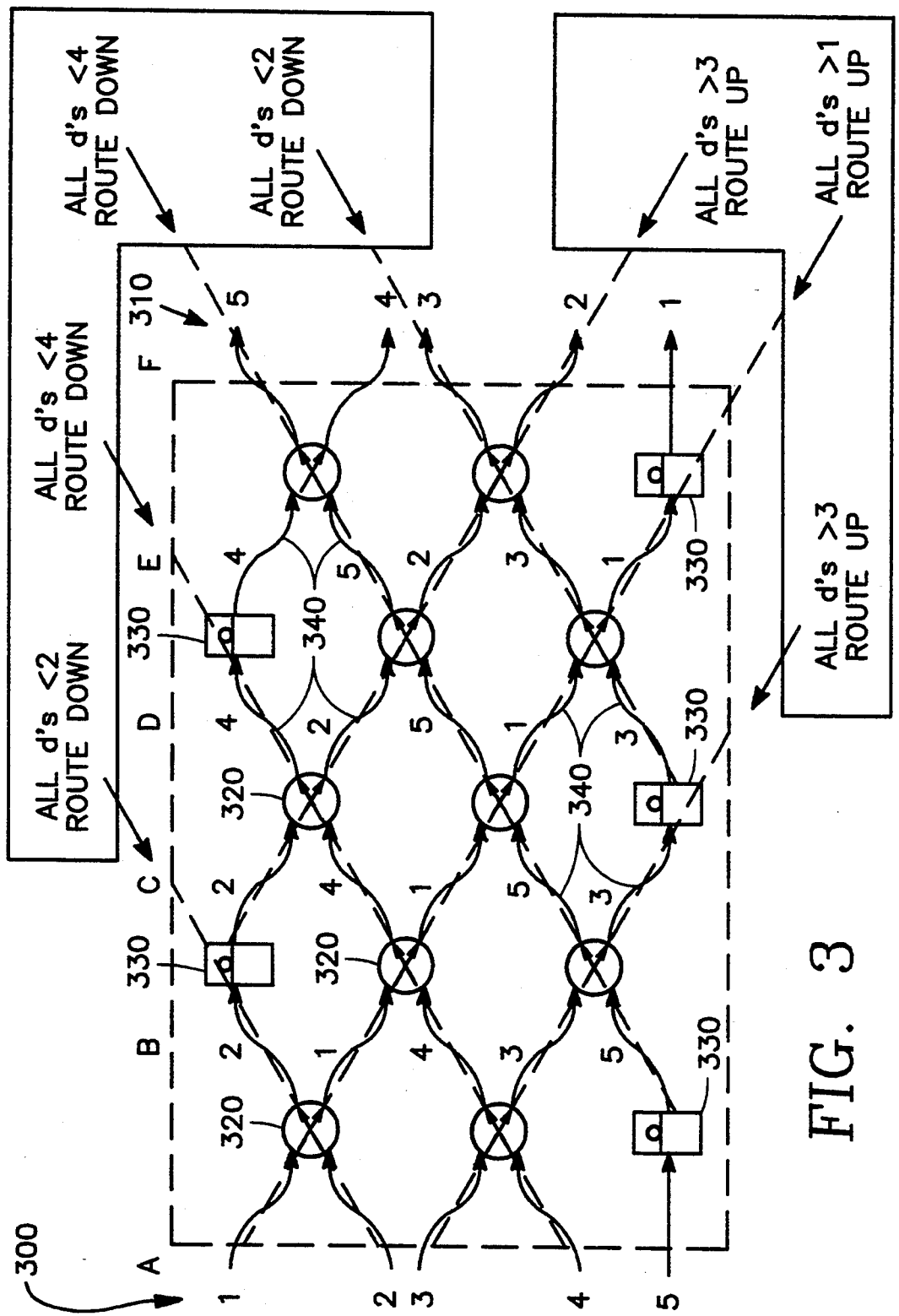
FIG. 3 is a simplified diagram illustrating a five-input permutation engine in accordance with an embodiment of the invention.
Figure 4:
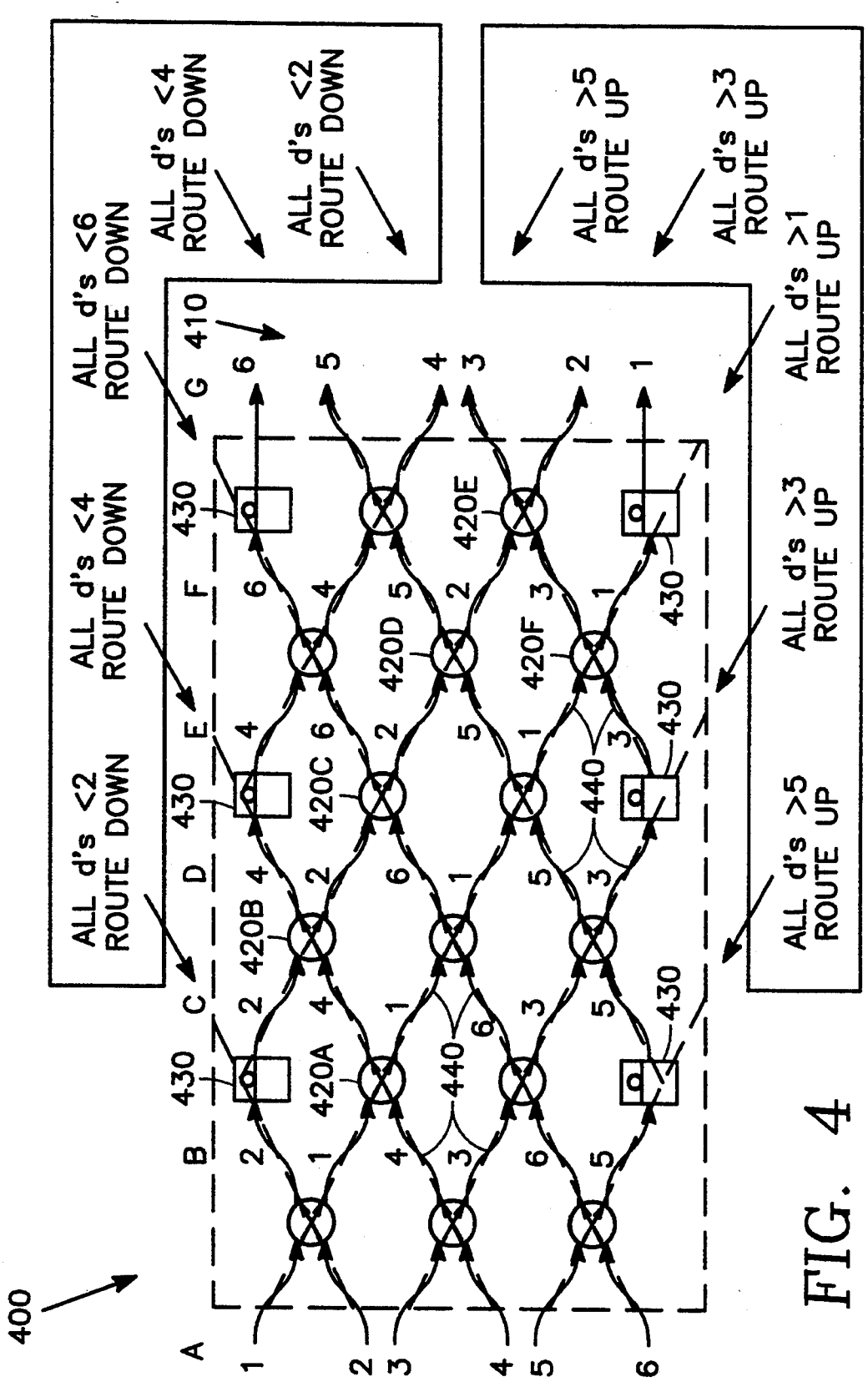
FIG. 4 is a simplified diagram illustrating a six-input permutation engine in accordance with a preferred embodiment of the invention.

FIG. 3 illustrates the mesh structure of a permutation engine in accordance with one embodiment of the invention having five input ports 300 numbered (from the top) 1 through 5 in the drawing and five output ports 310 numbered in reverse order (from the bottom) 1 through 5 in the drawings. There are five vertical columns of links 340 labelled respectively A, B, C, D, E from left to right in the drawing. FIG. 4 illustrates the mesh structure of a permutation engine in accordance with another embodiment of the invention having six input ports 400 numbered (from the top) 1 through 6 in the drawing and six output ports 410 numbered in reverse order (from the bottom) 1 through 6 in the drawing. There are six vertical columns of links 440 labelled respectively A, B, C, D, E, F from left to right in the drawing. A distributed routing algorithm of the invention is performed by respective controllers (not shown) at individual 2-by-2 switches 320 (FIG. 3), 420 (FIG. 4) of the permutation engine and dynamically routes packets through the mesh. The algorithm refers only to the location of each switch and the destination output port of the packet to route the packet to the desired port using a path which avoids blocking any other possible input-to-output connection. The combination of topology and routing algorithm constitutes the permutation engine of the invention.

The advantages of the permutation engine of the invention are: i) a strictly non-blocking crossbar is realizable regardless of the time and position order in which packets arrive (assuming no output port contention); ii) no header modification at each switch in the mesh, allowing for simple high-speed switching logic; iii) constant routing latency for any input to any output connection for no contention routing (which is good for optical approaches); iv) a simple distributed routing control mechanism; and v) a highly scalable architecture allowing for any number of input-to-output connections within technology constraints.

2×2 Switch Function

FIGS. 5A and 5B show the bypass and exchange states, respectively, of a typical 2×2 switch 320, 420 employed in the permutation engine of FIGS. 3 and 4. Any references to diagonal moves imply a 2×2 switch exchange state, while row parallel moves refer to the switch bypass state. Also, the term packet denotes an indivisible time slot of information. The routing mesh topology in FIGS. 3 and 4 allows any n-input to n-output permutation using n(n−1)/2 smart switches 320, 420. These switches are of the type disclosed by K. M. Johnson et al., "Optical Interconnection Network Using Polarization-Based Ferroelectric Liquid Crystal Gates," *Applied Optics*, Vol. 27, pp. 1727–1733, 1988. Such smart switches are arranged as n switch/delay element stages. In order to achieve constant routing latency, the mesh topology of FIGS. 3 and 4 is similar to that disclosed by Shamir et al., "High-Efficiency Rapidly Programmable Optical Interconnections," *Applied Optics*, Vol. 26 pp. 1032–1037 but augmented with delay elements 330 (FIG. 3), 430 (FIG. 4) of delay equal to the switching time. For any possible path from input to output, the mesh switching latency is just nT, where n is the number of I/O ports and T is the individual switching time.

Switching Protocol

In one implementation of the invention, a constant switching latency is not needed if the data is dynamically routed through the mesh with the packer's header (the packet header being that portion of the packet containing the identification of the packet's destination node). The purpose of using this approach is to use a very simple switch controller. The idea is that if the packet's length is small (e.g. one bit), then a mesh switch 320, 420 is held in the desired state for one bit time to allow the packet bit to propagate to the next stage. The problem with this approach is that a long packet needs to be injected into the mesh a bit at a time with addition of the header information to route the bit. This implementation complicates the hardware by having to combine the header with each data bit.

The preferred implementation is to route the header through the mesh and hold the affected switches in the desired states. Once the header reaches an output port of the permutation engine and establishes the complete data path to the desired output port, the entire data packet can then be routed, regardless of its length, by maintaining the states of the affected switches for the packet duration. The motivation here is to use this network to route optical data as opposed to electronic data. By maintaining a fixed network switching latency, a simple fiber delay line (equal to the latency) can be used to store the data before piping it into the switch matrix. The only complication to the switch control hardware is that the header information must be held long enough to account for the network switch latency and packet duration. This function can be implemented through electronic control (such as a counter), or by proper definition of the protocol in defining packet boundaries.

The protocol must incorporate a packet start bit to define the beginning of a data packet. If all packets are of equal length, an electronic counter is sufficient to determine the end of the packet. If packets can be of variable length, then a packet end bit needs to be defined in the protocol to mark this event. Due to the desire to route optical data and control, the packet start and end bits can be encoded on the first and last bits of the header, respectively. One way to accomplish this is to double the intensity of the start and end bits of the header and use an optical thresholding device (such as a self-electrooptic effect device or "SEED") to test for the bit. By storing the packet's destination output port number or address d in the switch controller (not shown) governing the 2×2 switch (320, 420) at the input port where the packet entered, all subsequent switches in the routing path of this packet will be locked until this packet has finished routing through the permutation engine. The purpose is to simplify the switch controller as much as possible to reduce the hardware cost, speed up the switching rate, and to permit implementation with electronics and/or electrooptic/optical devices.

Routing Algorithm for Simultaneous Packets

The basic premise for routing is to provide a simple, distributed control mechanism exercised by each switch using only local traffic destination information and avoiding header modification. This approach allows for local, high-speed control of the 2×2 switching elements 320, 420 for the proposed topology. Due to the high-speed operation of the switch controllers (not shown), rapid dynamic routing capability with inherent arbitration is achieved through a multistage switching matrix. The routing latency penalty for using many switch stages is alleviated by the speed achieved from the 2×2 switch control philosophy.

Link Labelling Scheme of the Routing Algorithm

In developing a routing algorithm for the diagonally oriented mesh topology of the type illustrated in FIGS. 3 and 4, the links 340, 440 between the switches 320, 420 are labeled to designate how the $i^{th}$ input would route to the $i^{th}$ output. At first glance it might seem appropriate to simply label input 1 to output 1, (for example) with the top row of links 340 (FIGS. 3), 440 (FIG. 4) being assigned a 1. The problem in using this approach, is that if the packet at input port 2 has as its ultimate destination output port 2, it blocks the packet at input port 1 from reaching any other output port except output port 1, since the top row of switches were all set to the bypass state by the packet at input 2.

A better labelling scheme, and the one employed in the present invention, is to set all the switches 320, 420 to the exchange state and label the links 340, 440 accordingly. The links 340, 440 of FIGS. 3 and 4 are therefore numbered in this manner in the drawings. As can be seen in FIGS. 3 and 4, the ordering of the inputs ports 300, 400 is reversed from that of the output ports 310, 410. In this situation, for any input to reach its associated output, it makes diagonal moves through the mesh, corresponding to the exchange state of the switches 320, 420. A diagonal move (exchange state) is better than a row parallel move (bypass state), in this respect, because it does not separate the mesh into two mutually unconnected meshes. Hence if a packet at input port 2 is routed to output port 2, a packet at input port 1 can go to output ports 1, 3, 4 or 5 for the 5-input case of FIG. 3.

This link labelling scheme allows for non-blocking routing using only the link labels to route packets and is a central feature of the permutation engine of the invention. This result can be understood by reference to a path intersection graph for this topology with the given link labelling scheme, as illustrated in FIG. 6. Vertices 600 in the path intersection graph correspond to a group of links connecting one input port to one output port (the vertices 600 being numbered 1–5 in FIG. 6A corresponding to the mesh of FIG. 3 and 1–6 in FIG. 6B corresponding to the mesh of FIG. 4). Two vertices in the graph are connected by an edge if their paths 610 intersect. The degree of a vertex 600 in the graph is the number of edges 610 connected to the vertex, which represents the number of input-to-output paths which intersect the path of the vertex. For the 5×5 and 6×6 permutation engines in FIGS. 3 and 4, the resulting path intersection graphs are $K_5$ and $K_6$, shown in FIG. 6. These are fully connected graphs of five and six vertices.

Basic Routing Strategy

The next step is to use the link labels along with the packet's destination output port number to actually route packets in a non-blocking manner through the mesh. As indicated herein above, such routing is controlled by individual controllers (not shown) governing respective 2×2 switches 320, 420. As discussed above, the path labelling scheme provides for a $K_n$ path intersection graph, where n is the number of I/O connections. In FIGS. 3 and 4, the $i^{th}$ labelled links define the optimal path for a packet beginning at the $i^{th}$ input destined for the $i^{th}$ output port, and a strictly non-blocking strategy calls for routing packets along these optimal paths. Since a packet will not usually enter the mesh at its optimal path input, the fundamental rule in routing packets is to steer them through the mesh using the link labels along the way until the desired optimal path is intersected. Once a packet reaches its optimal path, it will follow it to the designated output port.

The idea of a modified bitonic sort between packets is now discussed as one possible routing algorithm for the permutation engine of the invention. A bitonic sort of 2 m packets performs a comparison between two packets (at a 2×2 switch) and routes the packet with the larger destination address up. Thus 2 m packets sent through a 2 m stage diagonal mesh will result in ordering the largest destination output at the top and the smallest destination output at the bottom. This scheme makes intuitive sense since the larger destination number is always routed up. However, it requires packets be presented simultaneously at all the input ports to properly sort these packets, which is not always possible.

A better approach, and the one employed in the preferred embodiment of the present invention, is to refer only to the link labels and the packet's destination port in making the up/down decision at each 2×2 switch. If, for example, the optimal path from input 2 to output 2 is followed, the final destination is output port 2. To reach output port 1, a packet must eventually route into the (destination 1) favorable region of the mesh below the optimal path that defines input 2 to output 2. This region is all of the region of FIG. 4 lying below the left-to-right downward diagonal path consisting of the those links 440 labelled "2" in the drawing of FIG. 4. A closer inspection of FIGS. 3 and 4 reveals that by using this preferred link-labelling scheme, the number of the up (top) output link 340, 440 of each 2×2 switch 320, 420 is always larger than the number of the down (bottom) output link 340, 440. By defining the magnitude of the difference between a 2×2 switch output link label and the desired output port number d as $\delta_{up/down}$, an up/down decision is made by comparing $\delta_{up}$ with respect to $\delta_{down}$, where $\delta_{up} = |2\times2$ switch top output link label $- d|$ and $\delta_{down} = |2\times2$ switch bottom output link label $- d|$.

For example, referring to FIG. 4, a packet at the 2×2 switch 420A which is destined for output port 2 gives $$\delta_{up} = |4-2| = 2$$

and $$\delta_{down} = |1-2| = 1.$$

The rules for the routing algorithm in one embodiment of the invention are as follows:

I(A): if $\delta_{up} < \delta_{down}$, then route the packet up;
I(B): if $\delta_{up} > \delta_{down}$, then route the packet down;
I(C): if $\delta_{up} = \delta_{down}$, route the packet closer to the desired output row.

The end result of these routing rules is to arrange coincident packets in descending order of destination address d, when there is no output port contention. For the above example, $$\delta_{up}(=2) > \delta_{down}(=1),$$

hence the packet will use the bottom output of the switch 420A (in the absence of contention) and without consideration to finding a non-blocking path. The effect on the algorithm of finding a non-blocking path is discussed further below. The main point is that by following this decision-making scheme, a packet is eventually routed into its favorable region of the mesh which allows it to reach the desired output d. When a packet intersects its optimal path, it will follow this path to the desired output.

Non-Blocking Routing Strategy

The above methodology provides the means for simultaneous packets to successfully route through the network using only the output port number and the link labels for routing decisions at each 2-by-2 switch. It still does not address the issues of finding a non-blocking path and contention resolution when two packets desire the same intermediate link or the same output port.

In applying the $\delta_{up/down}$ rules (i.e., rules I(A), I(B) and I(C)), a bypass switch state may be desired. Any such row-parallel move must be checked for possible blocking of subsequent routing paths to available outputs. This is accomplished as follows:

For each output port number, the diagonal links 340, 440 of FIGS. 3 and 4 follow diagonal boundaries (dashed lines) defining the favorable regions for respective ranges of packet destination addresses d. These ranges are indicated in FIGS. 3 and 4 for all of the diagonal boundaries. Specifically, packets with destination addresses d greater than a certain number assigned to that diagonal boundary are routed above the diagonal boundary and packets with destination addresses d less than that number are routed below the diagonal boundary.

Referring to FIG. 4, the numbering scheme for these diagonal boundaries comes about as follows: Referring to FIG. 4 for example, a packet destined for output ports 2 or 3, for example, must reach the 2×2 switch 420E at the bottom right corner. With respect to the left-to-right descending dashed-line diagonal boundary intersecting switches 420B, 420C, 420D and 420E, the rules (IA–IC) require all row-parallel moves from bottom switch inputs on this diagonal to route up if d>3. Hence any packet destined for output ports 4, 5 or 6, must move diagonally upward at these switches to allow packets destined for ports 2 or 3 to reach their desired destinations. With respect to the left-to-right ascending dashed-line diagonal boundary intersecting switches 420E and 420F, the rules (IA–IC) require all moves from top switch inputs on this diagonal to route down if d<2. So a packet destined for output port 1 must make a diagonal move from the top input of these switches. The boundary values of 2 and 3 for these latter diagonal boundaries are the two output port addresses of the switch 420E.

With respect to the descending diagonal boundary intersecting the switches 420B–420E, a packet with any destination address d>3 does not have to travel along the coinciding links 440 to reach its output. With respect to the ascending diagonal boundary intersecting the switches 420F, 420E, a packet with any destination address d<2 does not have to travel along the coinciding links 440 to reach its destination. (These constraints are not meaningful concerning packets arriving at the switch 420E and destined for output ports 1, 4, 5 and 6, since they cannot reach their desired outputs. By selecting a non-blocking diagonal move in these cases, packets are always routed closer to their desired outputs while leaving open routing channels for the remaining unused output ports.)

All of the dashed-line diagonal boundaries (including those not overlying the right-most column of 2×2 switches) are required to define the favorable regions along optimal path boundaries. The reason for this approach is to avoid one packet blocking an optimal path for another packet when an alternate route for the one packet to its destination exists. Consequently, it is the optimal path to a given output port which defines the boundary of the favorable region for that output port.

An example of a packet destined for output port d=2 and incident on the bottom input of switch 420A in FIG. 4 is now discussed. The routing algorithm of Rules I(A)–(C) defined above would send this packet through the bottom output of switch 420A along those links 440 coinciding with the diagonal boundary labelled "1", since $\delta_{up} > \delta_{down}$. But this packet does not need to take this path since output port 2 is above output port 1 and this diagonal defines the output port 1 boundary. In fact, setting the switch 420E to the bypass state would block a later packet trying to route from input ports 1 or 2 to output port 1. Hence, any packets along this diagonal boundary destined for output ports $d>1$ are not allowed to make a row-parallel move (which requires a switch bypass state) to this diagonal boundary.

This rule is applied in reverse for row-parallel moves from the top input of a 2×2 switch. If a packet destined for output port $d=3$ is incident on the top input of the switch 420A, it in essence requests a row-parallel move to the top output of the switch 420A. But it is destined for output port 3, which is below the path defined by the output port 4 optimal path, so this packet should route down to avoid blocking packets destined for $d=4$, 5 or 6 at the bottom input of the switch 420A. By substituting the exchange state for the bypass state at the switch 420A, this packet moves into a favorable region and avoids potentially blocking a later packet whose optimal path is outside of this region. This rule is shown pictorially in FIGS. 3 and 4, and may be stated formally as follows:

II(A): For any packet received at a bottom switch input, a bypass or row-parallel move to a link 440 whose label number L is less than the packet's destination address d is forbidden, i.e., if $d>L$, with the exception for switches at the output ports (e.g., the switch 420E) for which a bypass is forbidden if $d>L+1$;

II(B): For any packet at a top switch input, a bypass or row-parallel move to a link 440 whose label number is greater than the destination d is forbidden, i.e., if $d<L$, with the exception for switches at the output ports (e.g., the switch 420E) for which a bypass is forbidden if $d<L-1$.

INTERMEDIATE LINK CONTENTION RESOLUTION

After incorporating the non-blocking capability into the algorithm (for simultaneous packets), the next step is to address contention resolution at an intermediate 2×2 switch—i.e. both inputs want the same switch output. Such a situation could occur, for example, if a packet at the top input of the switch 420A is destined for output port 2 (i.e., $d=2$) and a packet at the bottom input to the switch 420A is destined for output port 1 (i.e., $d=1$). Both packets are entitled (under Rule I) to use the bottom output port of the switch 420A and the bottom input packet is allowed (under Rule II) to make a row-parallel move since it is destined for output port 1. Because all row parallel moves are allowed only if no potential blocking can occur, it is in fact a requirement that a row parallel move—switch bypass state—must be allowed if either input packet is entitled under Rules I and II. Otherwise, if the exchange state is given priority over the bypass state, the packet requiring the row parallel move may not be able to reach its desired output port. In this case, the exchange state would block the packet destined for output port 1, but the bypass state does not prevent the top packet from ultimately reaching port 2. In fact, the packet for port 2 would be in a similar position at the next switch, but now it requires the bypass state which has priority. Hence the rule for contention is:

III. Whenever two packets contend for the same output port of an individual switch 420 under rules I and II, the bypass state of that switch is given priority over the exchange state.

The set of routing rules (rules I-III) and the mesh topology of the type illustrated in FIGS. 3 and 4 constitute the permutation engine.

Routing Examples

A permutation engine or network has been described above for sorting simultaneous packets using only the packet destinations and the link labels. A few routing examples are in order to demonstrate this aspect of the permutation engine and suggest a configuration for routing packet-asynchronous traffic. The following examples exhibit the properties needed to realize a packet-asynchronous non-blocking crossbar.

Routing with No Output Port Contention

FIGS. 7A-F, 8A-E and 9A-F are tables illustrating how simultaneous and single packet traffic routes through the permutation engine of FIG. 4 (tables of FIGS. 7A-F and FIGS. 9A-f) and the permutation engine of FIG. 3 (tables of FIGS. 8A-E), with no output port contention. The left-hand column of numbers shown in these routing tables are the input port numbers of the permutation engine with the right-hand column of numbers corresponding to the output port numbers (which are in reverse order). FIGS. 7A-F illustrate several routing examples where packets enter a 6-input permutation engine simultaneously. These examples are mostly similar to the bitonic sort but can differ as the table of FIG. 7F shows. Packets 3 and 4 exchanged places due to the non-blocking constraints on row parallel moves but did return to their correct positions before reaching the output stage of a single permutation engine. The bitonic sort would have kept all the packets moving in a row parallel fashion since this algorithm simply arranges packets in descending order.

In FIGS. 8A-E and 9A-F, a single packet is allowed to route completely (from left to right) before a second packet is injected into the permutation engine. As each packet is routed, the switches affected by its routing path are held locked for the duration. This situation is typical of long packets arriving at staggered times and demonstrates the permutation engine's non-blocking potential for individual packet routing. Closer examination of FIGS. 8 and 9, however, illustrates what happens when packets do not enter at the optimal inputs for the desired outputs. In FIG. 8e, the packets destined for outputs 2 and 4 do pass through a common 2×2 switch. Hence, if after routing all the packets in FIG. 8e, packets 2 and 4 were removed from the permutation engine depicted in this routing table, a new packet beginning at input port 1 could not reach output port 2 due to the current switch settings. The problem is that the path intersection graph for this particular routing table is not a fully connected $K_5$ graph.

The solution (illustrated in FIG. 10) is to cascade a first permutation engine 1000 with a second inverted permutation engine 1010 to obtain a $K_5$ path intersection graph. The first permutation engine 1000 is a sorting stage while the second permutation engine 1010 is an interconnection stage. The second permutation engine 1010 is inverted top-to-bottom so that the output labels of the first permutation engine 1000 line up with the input labels of the second permutation engine 1010.

A problem with a single permutation engine occurs whenever a packet destined for the $i^{th}$ output port enters at the $(n+1-i)^{th}$ input port—i.e. it begins and ends the route at the same row position. This input to output condition imposes the tightest constraint on the number of other input to output paths a particular route will traverse (as can be seen in FIG. 7F). This constraint is alleviated in the dual-permutation engine architecture of FIG. 10.

Figure 10:
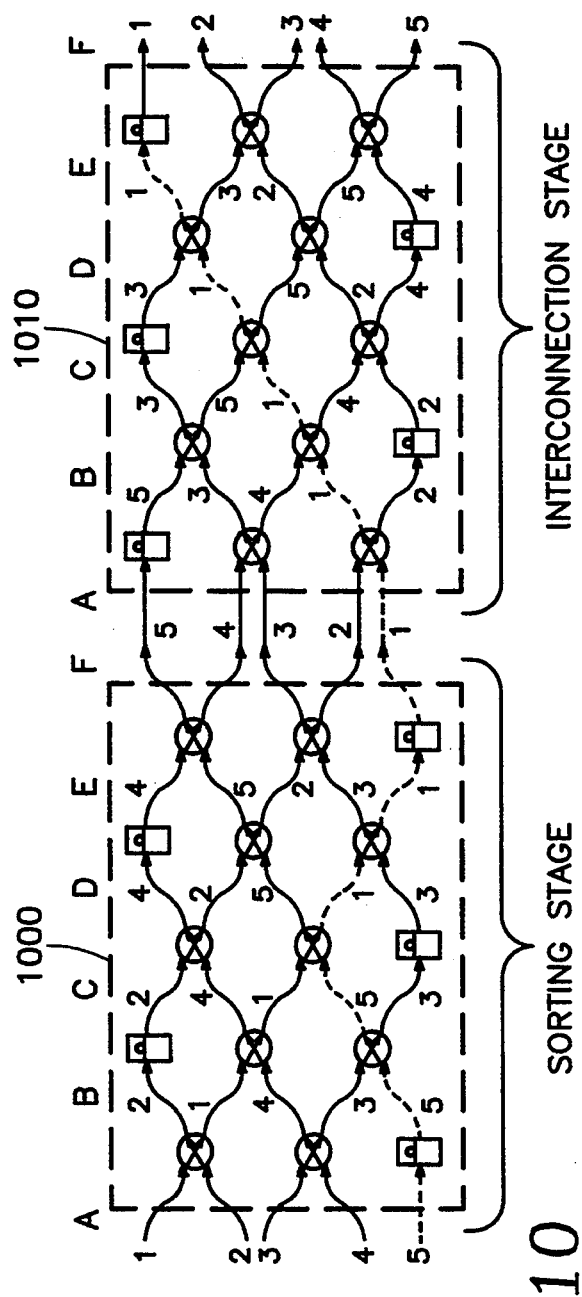
FIG. 10 is a diagram of a non-block crossbar consisting of a pair of cascade complementary permutation engines of the type illustrated in FIG. 3, of which the topology of one is inverted relative to the other.

In FIG. 10, a packet destined for output port 1 and beginning at input port 5 is shown by the dashed arrows. The routing path shown in the sorting stage 1000 is not the one the routing algorithm would select, but it illustrates the maximum possible extent of such a route into the first mesh. As can be seen, paths 2 and 4 are never crossed in the first stage or permutation engine 1000 but will be in the second stage 1010 due to the ordering of packets by the first stage 1000. In essence, the two stages 1000, 1010 perform complementary functions with sorting at the first stage 1000 and interconnection of paths at the second stage 1010. The reason why the two-stage configuration works may be seen in FIG. 10, when looking at the path from the $i^{th}$ row input port to the $i^{th}$ row output port. Since these routes now correspond to the n optimal paths, the resulting path intersection graph is a fully connected $K_n$ graph for this input-to-output permutation. To achieve strictly non-blocking operation for any input-to-output permutation requires m permutation engines, where m is n/2 for n even and (n+1)/2 for n odd.

The next issue is to address routing of partially simultaneous packets. FIGS. 11A-D are tables like those of FIGS. 9A-F, but exhibiting two examples when up to five input ports of a 6-input permutation engine have incoming packets. The tables of FIGS. 11A and 11B show packet flow in a cascaded pair of 6-input permutation engines (like the 5 input version of FIG. 10) using five simultaneous packets, while the routing tables of FIGS. 11C and 11D exhibit sequential packet routing with the same input traffic pattern. The order of the incoming packets for the sequential case is given in FIG. 11C by the left-hand column of numbers labelled "SEQUENCE" in the drawing.

As can be seen in FIGS. 11A-D, the packets were not completely sorted at the outputs of the first stage. The reason for this outcome is due to the non-blocking constraints imposed on row parallel moves by the routing algorithm described above. In the routing table of FIG. 11A, packets 2, 3, 4 and 5 were forced to move diagonally upward to avoid blocking the optimal path for output port 1. The non-blocking constraints in conjunction with the input position of packet 1 forced the other packets into making a "bad" move. Since the individual switches (or more precisely, their controllers which are not illustrated in FIG. 10) only have local knowledge of packet traffic, there was no way of knowing the position of packet 1 to avoid this situation. Conversely, if the last input was subsequently occupied by a second packet destined for output port 1, this path would need to be left open to route it.

This situation is avoided in the routing table of FIG. 11b, for two reasons. First, the non-blocking constraints are now imposed in the opposite sense because the second permutation engine is inverted. The effect is to offset the upshift caused by optimal path 1 with a similar down shift. Secondly, packet 1 is now at its optimal input position requiring only non-blocking diagonal moves to reach its desired output and so avoids the forced shift of other packets. The routing tables of FIGS. 11C and 11D exhibit a similar effect in the routing of the last packet destined for output port 4. In FIGS. 11B and 11D, the packet destined for output port 4 enters the interconnection stage at the optimal path input ports 5 and 6 respectively. In both cases this packet follows the output port 6 optimal path until intersecting the port 4 optimal path. The significance of this observation is that the routing algorithm selected this route while competing with four other packets in FIG. 11B and left only this route open for the packet destined for output port 4 in FIG. 11D (i.e., the packet whose progress through the mesh is denoted by the trail of numeral 4's in the drawing). In both cases, the routing algorithm sent the misrouted packet down an unused optimal path (to output port 6), until the packet intersected the desired optimal path (to output port 4). The other packets were on their desired optimal paths after the first column of switches in the interconnection stage. As such, all remaining packets are "connected" to their desired outputs (due to the $K_n$ path intersection graph defined by the optimal paths), resulting in the strictly non-blocking property for cascaded stages of permutation engines of the type illustrated in FIG. 10.

Implementation

Figure 13:
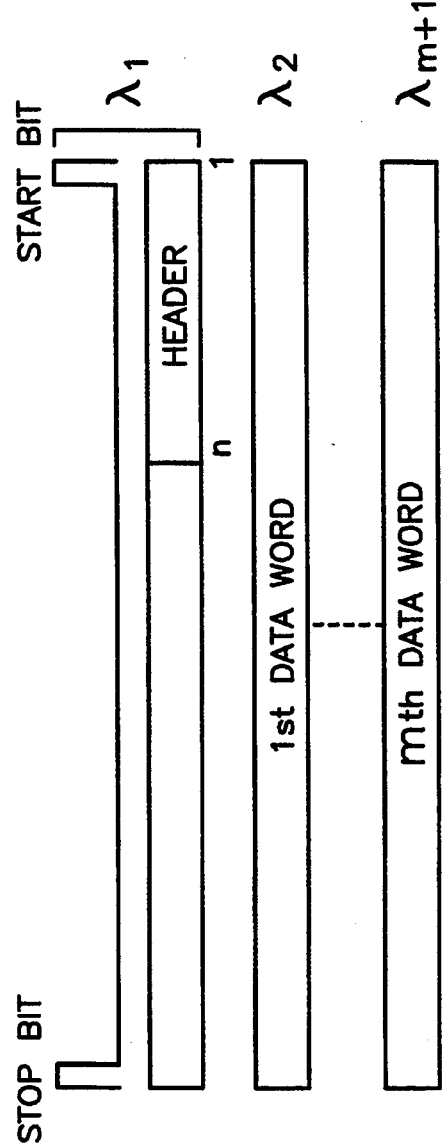
FIG. 13 illustrates a preferred packet data format including the packet header.
Figure 12:
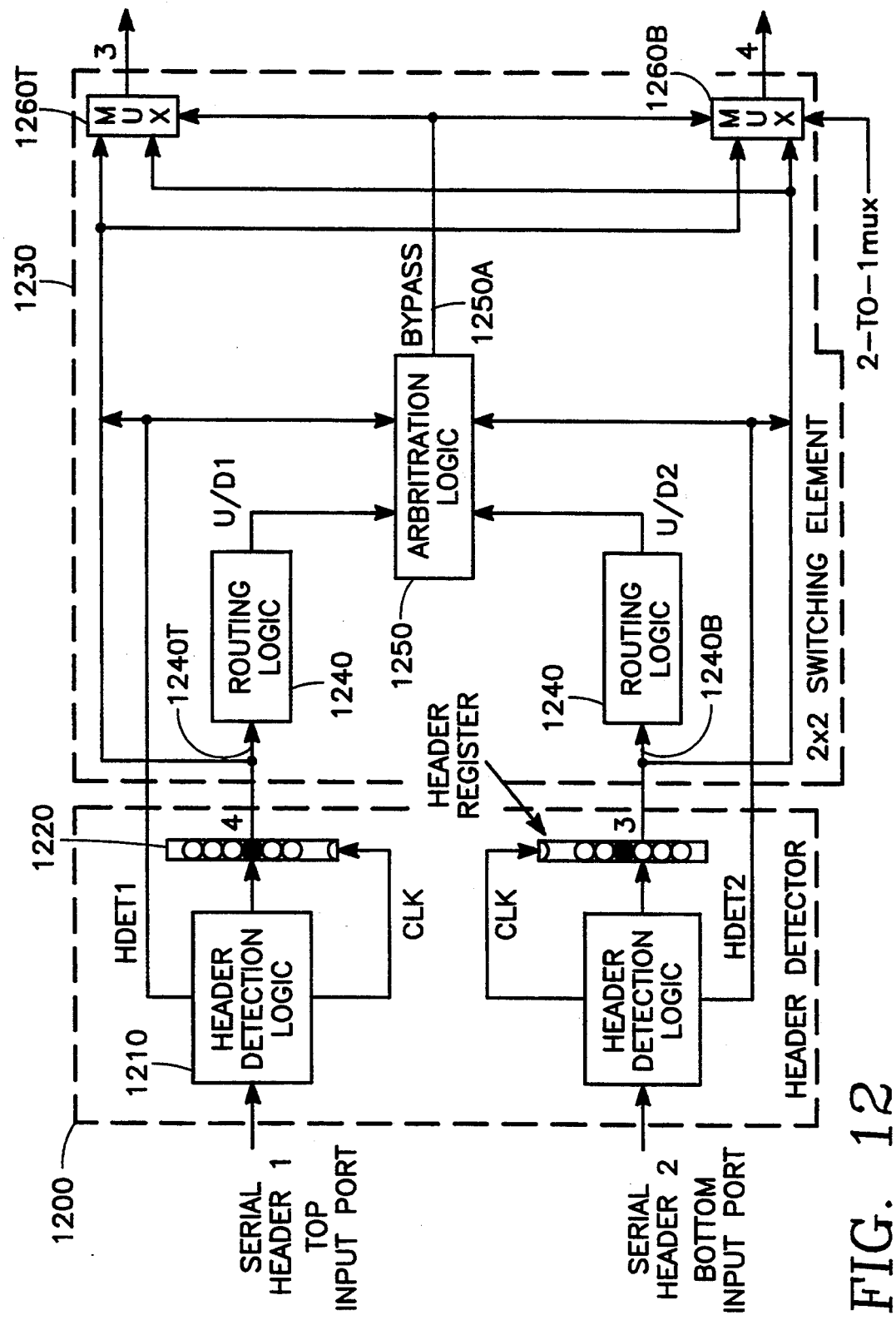
FIG. 12 illustrates a controller circuit governing an individual 2×2 switch in the permutation engine of FIGS. 3 or 4.

The utility of the routing topology and algorithm of the invention arises from the generality of the routing capability and advantageously requires only simple logic to implement an actual controller for each $2\times 2$ switch 320, 420 of a permutation engine of FIG. 3 or 4. In the foregoing description, such a switch controller has been alluded to as controlling the exchange and bypass states of an individual $2\times 2$ switch 320, 420, but not shown or described. One preferred implementation directed to an all-optical data path switching node is now described, although the controller is not limited to any particular implementation. FIG. 12 illustrates a packet header detector and $2\times 2$ switching element of that implementation. In the description that follows, it is understood that each $2\times 2$ switch 420 of FIG. 4 is governed by an individual $2\times 2$ switching element 1230 of FIG. 12. The array of all $2\times 2$ switches 420 of FIG. 4 forms a "data plane" while the array of all switching elements 1230 forms an overlying "header plane", both planes being illustrated in FIG. 18 which is described later in this specification. FIG. 13 illustrates the packet format for use with the apparatus of FIG. 12.

Packet Format

A serial packet format is suitable for packet-switched networks which can handle long duration packets. The performance of such networks is significantly enhanced by using buffers to avoid packet deflection from output port contention. For the proposed all-optical data path switching node, such buffering capability is not currently available. In order to reduce the probability of packet contention at the output ports of a switching node, it is desirable to reduce the packet duration by parallelizing the header, data and trailer information as shown in FIG. 13. For an all-optical data path network, this scheme is realized by using a wavelength division multiplexed (WDM) format where the start/stop bits, header, and m data words are encoded onto different optical wavelengths $\lambda_1, \lambda_2, \ldots$, etc.

By using the start and stop bits to mark the boundaries of the packet, a mechanism exists to maintain the switch states in the permutation engine for a given packet length. In an optical scheme, these bits can be encoded as double intensity bits (as the first and last bits at the header wavelength) with intensity sufficient to enable the header detection logic. If the active part of the header is defined as the first n bits, a packet delay of n bits is necessary before inserting the packet into an optical n×n switching matrix which is controlled by the permutation engine. Here n is the dimension of the permutation engine, which corresponds to the number of input/output ports. This delay is the time necessary to parallelize the first n header bits for routing of the packet header through the permutation engine mesh topology.

The resulting header format from header detector 1200 of FIG. 12 is an n-bit binary word having only one "on" bit whose position in the word corresponds to the output port number of the permutation engine. In this scheme, the start/stop bits of the undelayed packed are used to enable/disable detection logic 1210 of the header detector 1200, while the start/stop bits of the delayed packet are used to lock the affected switches 320, 420 (FIGS. 3 and 4) in the permutation engine until the packet has routed through the optical switching matrix.

The format must incorporate a packet start bit to define the beginning of a data packet. If all packets are of equal length, an electronic counter is sufficient to determine the end of the packet. If packets can be of variable length, then a packet end bit need also be defined in the protocol to mark this event. By using the double intensity scheme for the start/stop bits, an optical thresholding device, such as a self-electrooptic effect device or SEED (not shown in FIG. 12), can be used to test for these bits. By storing the packet's destination output port number, d, in header register 1220 of FIG. 12, all subsequent 2×2 switches 320, 420 (FIGS. 3 and 4) in the routing path of this packet will be locked until this packet has finished routing through the optical switching matrix. Additional explanation of this mechanism is presented in the following. The object is to simplify the switch controller's functionality as much as possible to reduce the hardware cost, speed up the switching rate, and allow for an implementation suited to electronics and/or electrooptic/optical devices.

Header Detection Logic

Figure 14:
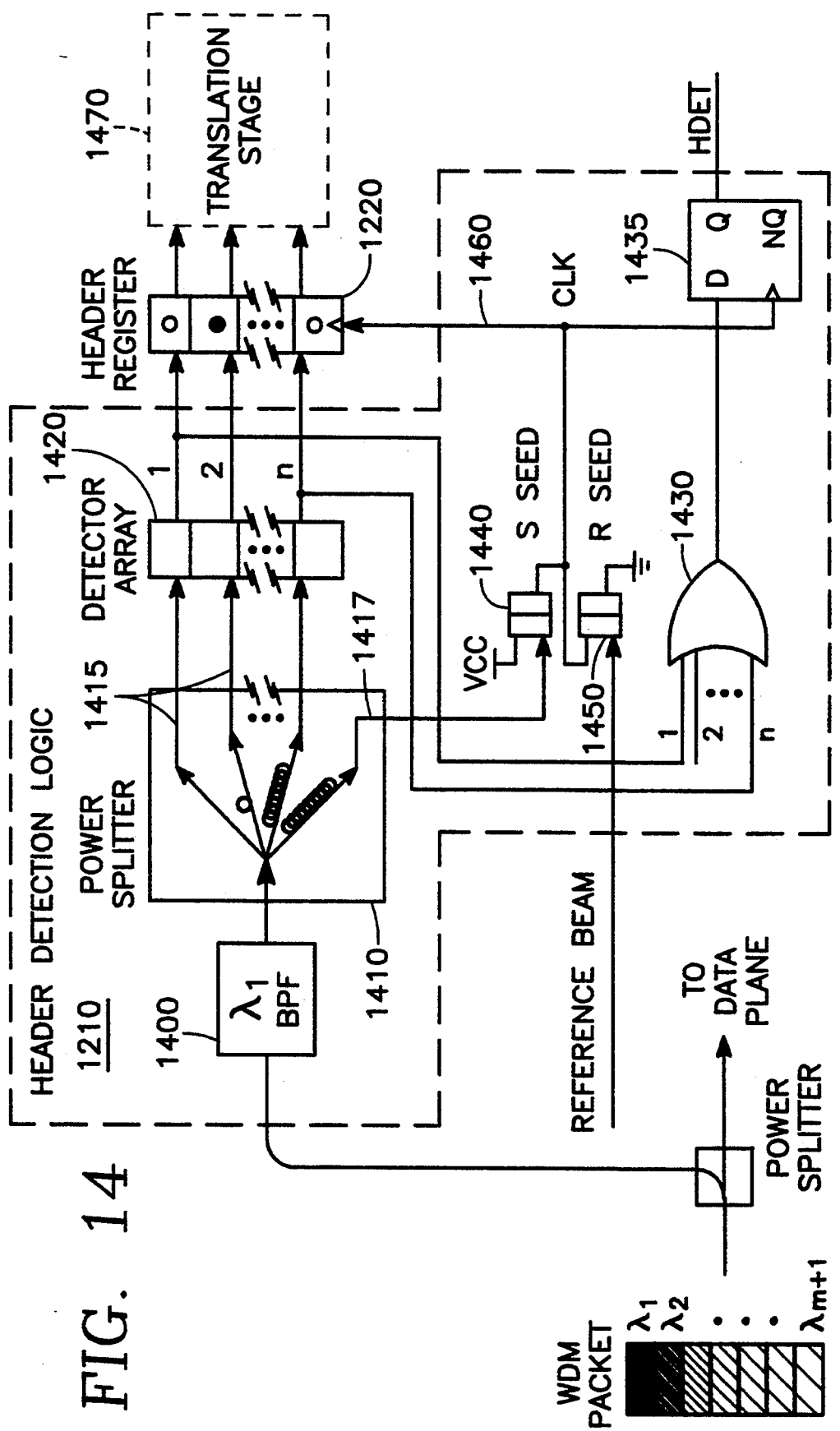
FIG. 14 illustrates header detector logic employed in the header detector of FIG. 12.

FIG. 14 illustrates a possible implementation of the header detector 1200 of FIG. 12 using the parallel packet format in FIG. 13 with a wave-division multiplex (WDM) packet. A WDM packet enters the header detection logic 1210 in FIG. 14 and is power-split and bandpass filtered by a filter 1400 to recover the header information at wavelength $\lambda_1$. The serial header is passed through an optical tapped delay line 1410 to parallelize the header bits. Each one of the n outputs 1415 of the tapped delay line 1410 provides one bit of the packet's header which is input into a detector array 1420 and stored in the header register 1220. The output of the detector array 1420 is also fed into an n-input OR gate 1430 controlling a flip-flop 1435 which provides a header detect signal HDET. By adding an extra (n+1$^{st}$) output tap 1417 to the tapped delay line 1410 with tap delay equal to the maximum delay tap for the header plus one bit time, a double intensity start bit can be used to clock the packet header into the header register 1220. By feeding the extra tap 1417 into an S SEED 1440, and setting the intensity of a reference beam illuminating an R SEED 1450 such that only the double-intensity start bit has the necessary intensity to trigger the S SEED 1440, a properly aligned clock pulse signal 1460 is generated to load the packet header bits into the header register 1220. This clock pulse is also used to hold the header detect signal HDET at the Q output of the flip-flop 1435 for the duration of the packet.

The foregoing implementation provides a self-clocking mechanism using the start bit for latching of the packet header bits into the header register 1220. A good feature of this implementation is that the header detection function is format-independent. Since the start bit is used to clock the packet header, there are no constraints placed on the encoding scheme of the header for fiber optic compatibility. Furthermore, placing the start bit at the same frequency as the header information avoids pulse skew problems due to fiber dispersion and allows for long range communications. One requirement is maintaining the optical power levels within certain limits in order to properly sense the start bit while avoiding spurious clocking from the header bits. One way to fulfill this requirement is to use a cascaded chain of optical amplifiers with intervening lossy elements to set the optical power level.

If the permutation engine is to be used as a switching node for a larger network, it becomes necessary to incorporate a header translation stage 1470 after the header detection logic of FIG. 14. The function of the translation stage 1470 is to convert the network address of the packet's destination node in the global network into a permutation engine output port address of the particular node at which the packet has been received. In essence, the address translation stage 1470 implements the routing algorithm of the global network by selecting the appropriate permutation engine output in accordance with the desired global routing algorithm. The translation state 1470 is a lookup table with input coming from the header register 1220. The output of the lookup table of the translation stage 1470 provides the desired permutation engine output port number. The advantage of this scheme is that any encoding scheme used for the packet header can be incorporated into the lookup table. Hence the lookup table of the translation stage 1470 not only implements the global network routing algorithm but also provides the decoding function without placing constraints on the header coding scheme.

Header Plane 2×2 Switch Operation

The purpose in developing the permutation engine is to realize a very simple switch controller. By maintaining a fixed network switching latency, a simple fiber delay line (whose delay is equal to the switching latency) can be used to store the data before piping it into the switch matrix. The only complication to the switch control hardware is that the header information must be held long enough to account for the network switch latency and packet duration. This function can be implemented through some form of electronic intervention (such as a counter), or by proper definition of the start and stop packet bits of FIG. 13.

At the left of FIG. 12, two packets are incident at the top and bottom input ports of the header detector 1200, including, respectively, serial headers 1 and 2 as labelled in the drawings. For ease of explanation, the header format is defined such that only one bit of the header is "on" indicating the desired permutation engine output port number. As such, a 6-bit binary number (for the 6-input permutation engine of FIG. 4) is stored in the header register 1220 indicating the desired permutation engine output port for each packet. In the present example, the packet header at the top input port of 2×2 switching element 1230 is destined for permutation engine output port 4 while the bottom packet is destined for output port 3. The top and bottom outputs of the 2×2 switching element 1220 receive the headers of the bottom and top inputs, respectively, indicating that the permutation engine routing algorithm selected a switch exchange state for this example.

As mentioned herein above, the header register 1220 maintains the output port ID until the packet is routed using the undelayed header start/stop bits. The routing algorithm of Rules IA-IC and II are implemented as follows: At any given 2×2 switch 420 of the 6-input permutation engine of FIG. 4, packets at either top or bottom switch inputs having destinations d in the range from 1 to $j-1$ require the bottom 2×2 switch output while packets having destinations d in the range from j to 6 require the top switch output, where $1 < j < 6$ and is determined by the switch's location in accordance with Rules IA-IC and II. In order to determine which 2×2 switch output a header requires, each routing logic block 1240 in FIG. 12 performs a magnitude comparison between d and j, where the value of j is determined by the location of the 2×2 switching element 1230 and the 2×2 switch 420 controlled by it within the permutation engine mesh. Due to the fact that the value of j is independent of the packet traffic, a very simple binary magnitude comparator can be realized using an OR gate 1500 (FIG. 15) for the routing logic 1240. FIG. 15 shows an example for the case $j=4$. The numbers at the inputs of the gate 1500 indicate a connection to the bits of the header register 1220. If bits 4, 5 or 6 from the header register 1220 are turned on, the U/D output of the gate 1500 is active resulting in the decision to use the top 2×2 switch output. If none of these bits is on, then U/D gate output is inactive resulting in a request to use the bottom 2×2 switch output.

Figure 19A:
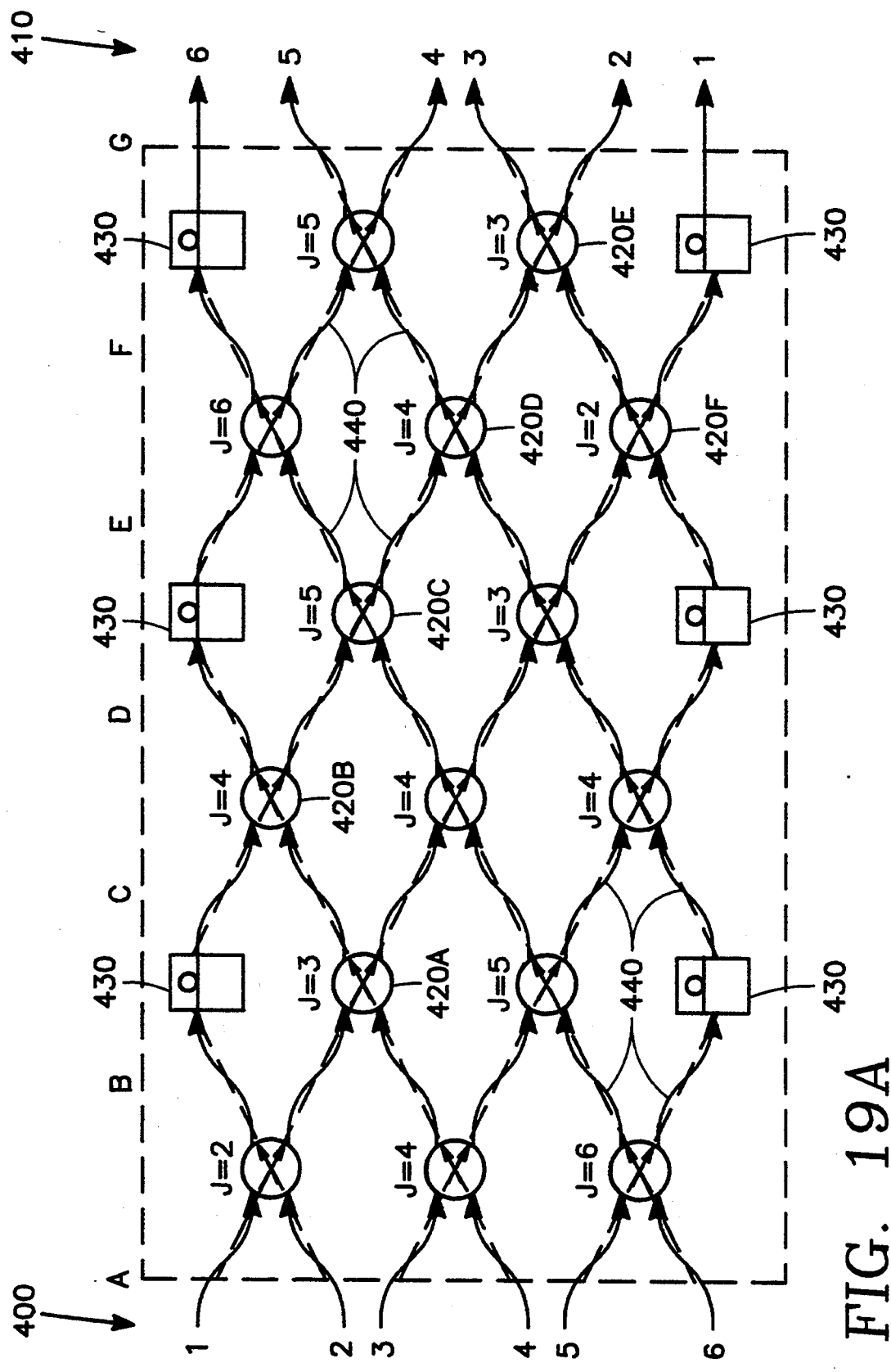
FIGS. 19A and 19B illustrate the programming connections of the inputs to the OR gate of FIG. 15 for the mesh topology of FIGS. 4 and 20 respectively.

FIG. 19A is a simplified diagram of the permutation engine of FIG. 4 and indicates the value of j for each switch 420 in the permutation engine of FIG. 4. Using FIG. 19A, the skilled worker implements Rules I and II in the routing logic 1240 of FIG. 12 by connecting to the inputs of each OR gate 1500 those bits of the corresponding header register 1220 whose values are j and greater.

The two U/D outputs from the two routing logic blocks 1240 are fed into the arbitration logic block 1250 in FIG. 12. FIGS. 16A and 16B show two versions of the arbitration logic block 1250 for two modes of operation. The version of FIG. 16A holds the switch state for one bit time while the version of FIG. 16B will hold the switch state until the header register data is removed. In FIG. 16B, the HDET1 and HDET2 lines are used to disable the node clock, node_clk, until both of these lines are inactive. This freezes the state of the 2×2 switching element 1230 until both packets have traversed this switch. Once this condition is met (meaning the switch is no longer in use), the node clock is enabled to allow routing of subsequent headers based on the states of the U/D lines. In either case, the contention resolution of the algorithm gives the bypass switch state priority over the exchange state. Hence the functionality of the arbitration logic 1250 is that of a two-input OR gate 1600 (FIGS. 16A and B) with inputs U/D1 and the bar signal of U/D2. When U/D1 is active, the packet header at the top input 1240T of the 2×2 switch 1230 requires the top output 1260T and U/D2 indicates that the packet header at the bottom input 1240B requires the top output 1260T. In FIG. 12, U/D1 and the bar signal of U/D2 are both inactive so that the exchange state of the switch results.

For the arbitration logic in FIG. 16A, the packet length must be kept small (e.g. one bit), so that a mesh switch is held in the desired state for one bit time to allow the packet to propagate to the next 2×2 switch stage. The problem with this approach is that a long packet needs to be injected into the mesh a bit at a time with addition of the header information to route the bit. This method not only complicates the hardware by having to combine the header with each data bit but may scramble the bit-ordering within the packet when output port contention occurs. Although the arbitration logic of FIG. 16B is slightly more complex, it routes the header through the mesh and holds the affected switches in the desired states.

Once the header reaches an output port and sets the data path for the desired output port, the data can then be routed, regardless of its length, by maintaining the states of the affected switches for the packet duration. This scheme in effect operates the network in a circuit switched mode but with fixed routing latency for optical data as opposed to electronic data. Due to the fixed routing latency, there are no request or acknowledge signals typical of a circuit network, which keeps the logic simple.

With the switch state set, the arbitration logic 1250 sets the state of two 2-to-1 multiplexers 1260 in FIG. 12. For the 6-input permutation engine where each bit of the header specifies one output port, each multiplexer 1260 is 7-bits. Six bits are needed to route the header and the seventh bit is needed to route the HDET line with the header to the next 2×2 switching element. The size of the multiplexers 1260 can be reduced by encoding the header as a base two number using the lookup table 1470 discussed previously.

Figure 18:
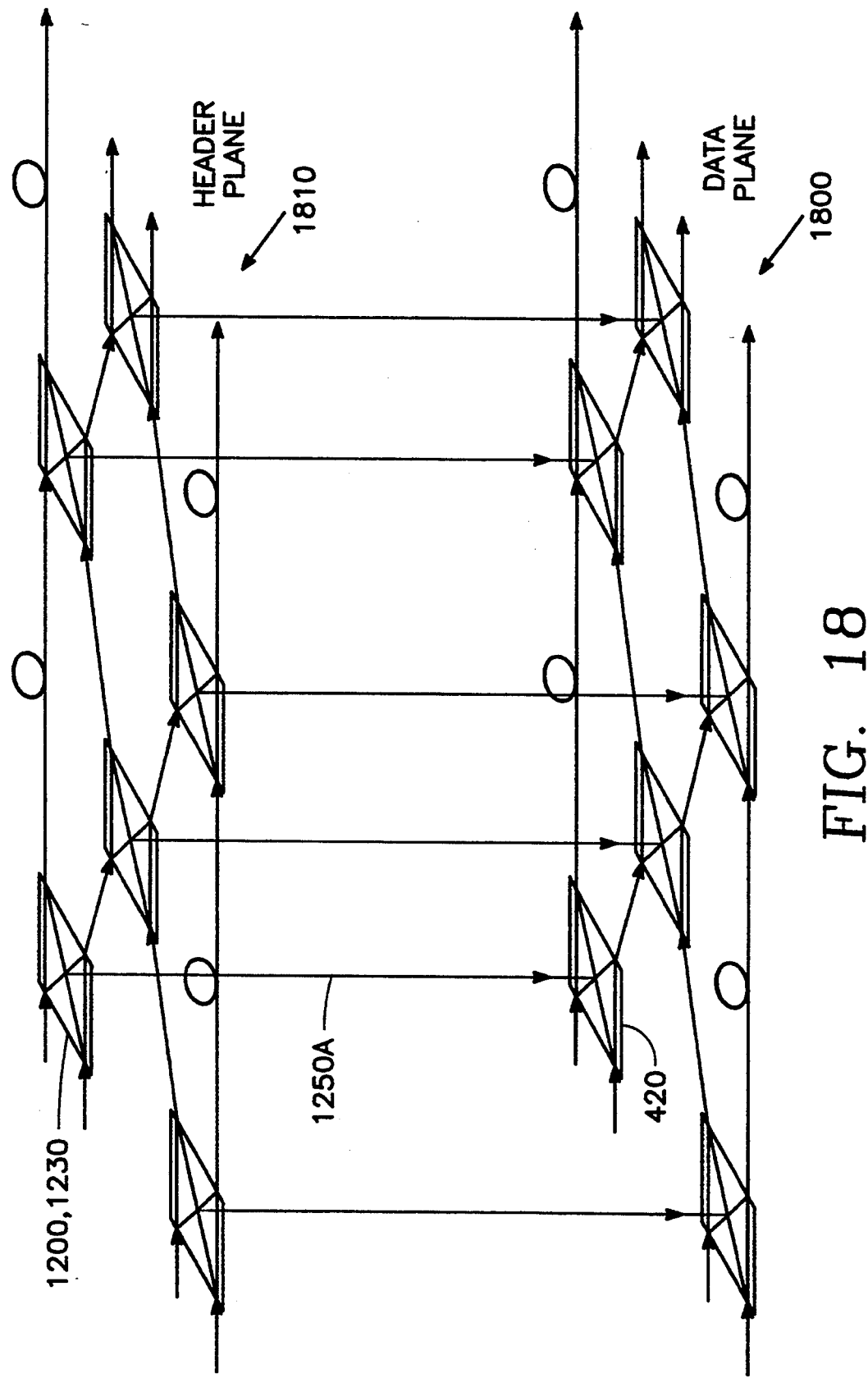
FIG. 18 illustrates the preferred integration of the control and switching functions in respective header and data planes.

The routing of the data packets is performed in the data plane or mesh topology of 2×2 optical switches 420 of FIG. 4 in the manner illustrated in FIG. 18. The bypass line 1250A of the arbitration logic controls not only the multiplexers 1260 of the switching element 1230 of the header plane but also the corresponding individual switch 420 in the data plane of FIG. 18. The bypass line 1250A transmits a single bit determining whether the switching element 1230 and the underlying optical switch 420 are to be in the bypass state or the exchange state.

Data Plane Switching Matrix Operation

Two types of switching approaches are useful for implementing the optical data plane. The first is to use a 2D array of pixel elements with beam spreading and combining optics to realize an inner product optical crossbar. The second approach is to build a mesh of 2×2 optical switching elements where each switch corresponds to one switch of the header plane. In both cases the control comes from the header routing plane using the bypass lines 1250A from the 2×2 switching elements 1230.

In the first approach, each input to the crossbar is split n ways and connected to one column of a 2D array of pixel elements using a half star coupler. The n outputs from a row of the 2D pixel array are combined with a half star coupler allowing any input to send data to any output. This architecture is an $n^2$-parallel matrix vector inner product processor, where n is the number of inputs and outputs. FIG. 17 shows a 4×4 crossbar using this approach.

The drawbacks associated with this approach are threefold. First of all is the $1/n^2$ power loss associated with the fan-out and fan-in operations due to the half star couplers. The net power loss is 1/n for such a construct. To get around this problem, semiconductor optical amplifiers can be used for the pixel elements to compensate for this loss. But this approach requires n amplifiers with twice as many fiber pigtails. Although this approach is workable, it is relatively expensive at a cost of several thousand dollars per amplifier/pigtail combination.

Secondly, this approach does not provide a mechanism for setting the output optical power levels. While the optical amplifiers can boost the optical signal power, an external automatic gain control (AGC) mechanism is needed to set the signal power with certain limits. Without the AGC function such a crossbar would not be well suited to a MIN configuration due to the need to cascade multiple crossbars.

Finally, there are two control strategies which can be used for an n-input to n-output crossbar of this configuration. In the first approach, a total of $n^2$ control lines are needed—one for each pixel element. The timing for this scheme is simple but it requires a mapping of the bypass lines 1250A from the $m*n*(n-1)/2$ 2×2 switches in the header plane to the $n^2$ pixel elements in the data plane. This scheme becomes unwieldy for large values of n. In the second approach, shown in FIG. 17, 2 n control lines are used where n of the lines are used to select the source input port and the remaining n lines select the desired output port. This configuration is complicated by the fact that a common group of control lines are used for setting pixel elements and requires time multiplexing of the control signals for configuring the individual pixel elements. The timing logic is further complicated by the fact that the permutation engine is designed to work with packet asynchronous data traffic. Consequently, this crossbar topology is not well-suited to the permutation engine controller, although it could be a possible implementation of the invention.

In the second approach, which is the preferred one, a mesh topology of 2×2 optical switches 420 constituting the data plane is mated via the bypass lines 1250A to the header plane as shown in FIG. 18. The advantages of this approach are as follows: i) use of a planar topology suitable for integrated optic design; ii) optical signal regeneration; and iii) compatibility with the permutation engine controller. By building an optoelectronic integrated circuit (OEIC), 2×2 optical switches can be realized using semiconductor amplifiers with fiber pigtailing required only at the input and output stages of switches. Connections between intervening stages of switches are through integrated optic waveguides, thereby reducing the number of pigtails from 2 $n^2$ to 2n. These 2×2 switches are directly controlled by the bypass lines 1250A from the header plane 2×2 switches with no overhead cost to the controller logic. Furthermore, by cascading stages of amplifiers and loss elements, an optical regeneration scheme is realized. Here the gain comes from amplification in a 2×2 switch with the loss resulting from coupling and waveguide losses between switches. The time average optical power is set by the amount of loss between amplifier stages. The basic idea is that the signal level builds up to the level where saturation effects in the amplifiers reduce their gain to just offset the loss between stages.

Cylindrical Permutation Engine

Figure 20:
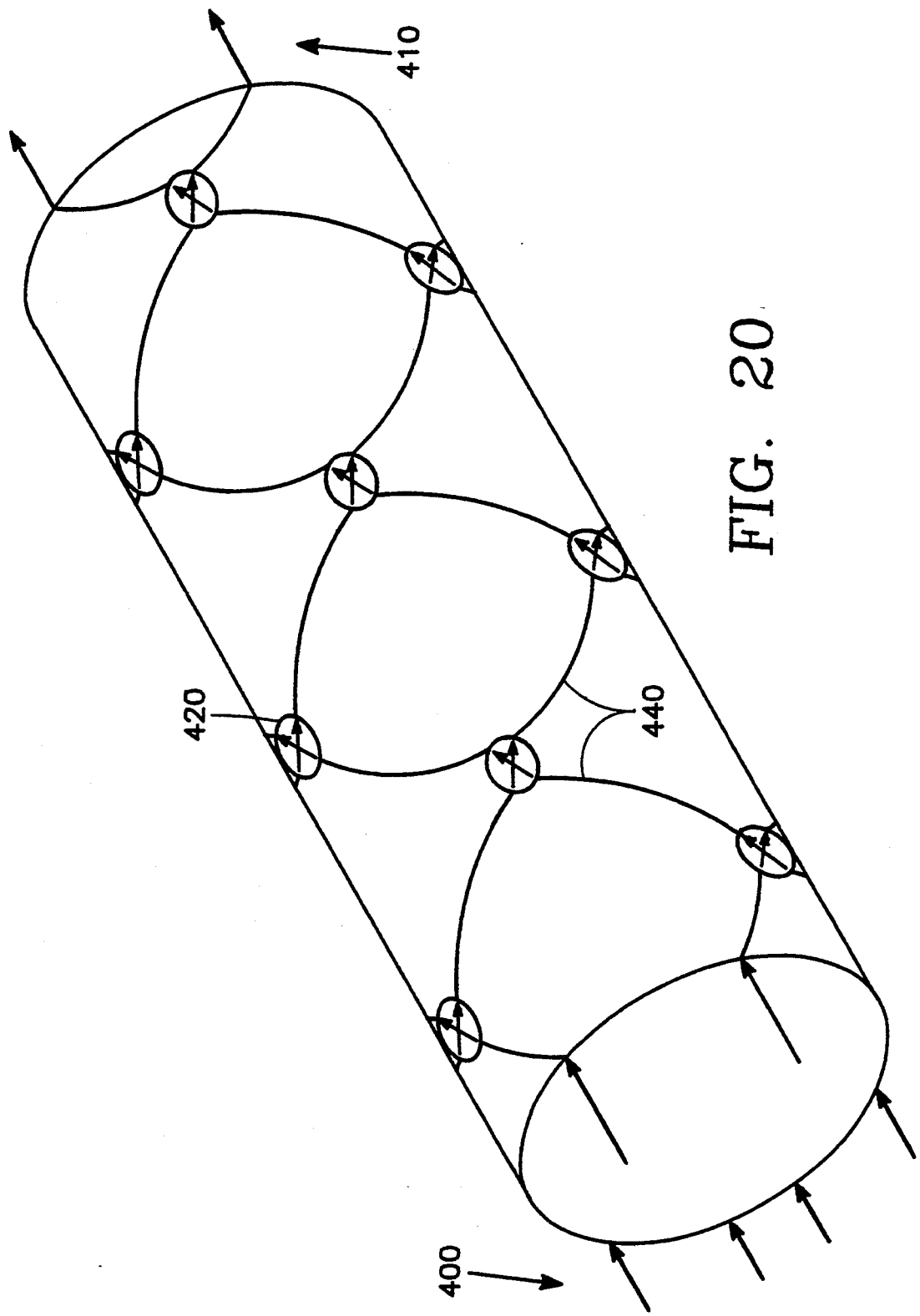
FIG. 20 illustrates an alternative embodiment of the permutation engine of the invention.

Returning again to the example of FIG. 4, a more robust permutation engine can be made by wrapping the topology about an axis parallel to the general direction of packet flow therethrough, so that each of the delay elements 430 on the top of FIG. 4 coincides with a delay element 430 at the bottom of FIG. 4, and then replacing each pair of coinciding delay elements 430 by a single 2×2 switch 420', to produce the cylindrical-topology permutation engine illustrated in FIG. 20.

Figure 19B:
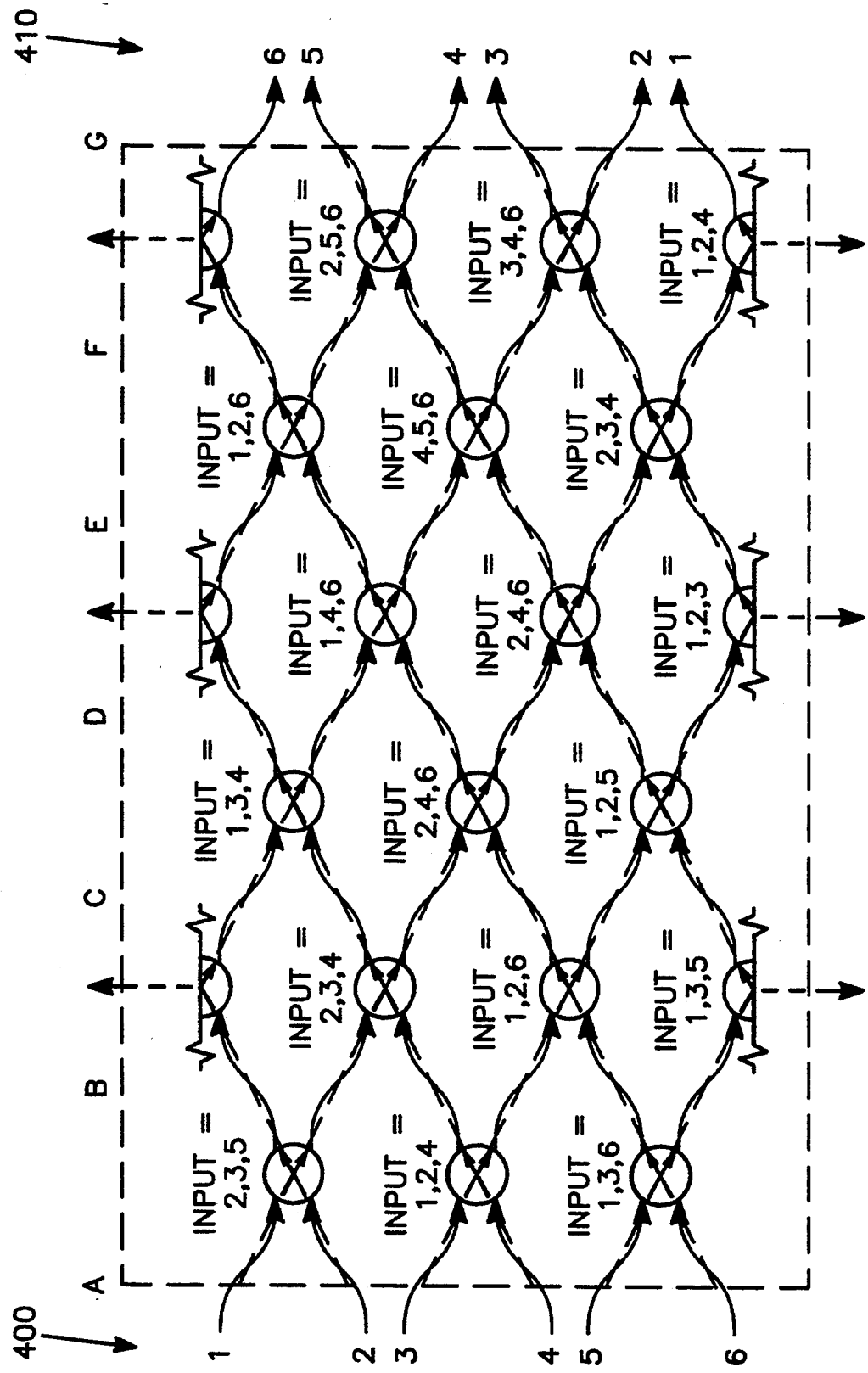

However, Rule I as stated herein previously must be modified to properly route the packets through the permutation engine topology of FIG. 20. This is because the definition of Rule I applicable to the permutation engine mesh topology of FIG. 4 relied upon the delay elements 430 to "reflect" packets away from the edge and back toward the center of the mesh, allowing some packets to be switched initially in directions away from their destination output ports. With the removal of the "reflecting" delay elements in the cylindrical topology of FIG. 20, Rule I must be modified so that each switching decision tends to route a packet more directly toward its destination output port. Otherwise, some packets may tend to travel more around the circumference of the cylindrical topology of FIG. 20 rather than along the desired direction. The modification to Rule I required to properly route packets in the cylindrical embodiment of FIG. 20 is defined in FIG. 19B. FIG. 19B indicates which outputs of the header register 1220 are applied to the input of the OR gate 1500 in the routing logic 1240 of FIG. 12 for each 2×2 switch 420.

While the invention has been described with reference to embodiments employing only 2×2 switches (320 or 420), the invention may also be implemented using other types of exchange switches (e.g., 4×4, 8×8, etc.). Specifically, the routing mesh topology of FIG. 4 for example may be only a single plane of a permutation engine having many routing topology planes identical to that of FIG. 4. While the interconnections within a given plane are through the two input and two output ports of each switch 420 illustrated in FIG. 4, connections between planes are made through additional pairs of input and output ports (not shown) of each switch 420. For example, if two planes are employed, then each switch 420 is a 4×4 switch.

While the invention has been described in detail by specific reference to preferred embodiments, it is understood that variations and modifications thereof may be made without departing from the true spirit and scope of the invention.

What is claimed is:

1. An N×N crossbar for routing packets from a set of N input ports to a set of N output ports, each packet having a header identifying one of said output ports as its destination, comprising:

a plurality of individual links which carry individual packets, each link having a link input end and a link output end;

a plurality of switches, each of said switches having at least top and bottom switch inputs connected to a corresponding pair of said link output ends and top and bottom switch outputs connected to a corresponding pair of link input ends, wherein each switch is connected to four different links and wherein different outputs of each one of at least some of said switches are connected through respective links to inputs of different switches, each of said switches having an exchange state which routes packets from said top and bottom switch inputs to said bottom and top switch outputs, respectively, and a bypass state which routes packets from said top and bottom switch inputs to said top and bottom switch outputs, respectively; and a plurality of individual controller means governing respective ones of said switches for sensing from a header of a packet at each switch input the identity of the destination output port of the packet and selecting one of said exchange and bypass states as a function of the identity of said destination output port and as a function of the location of the corresponding switch relative to said destination output port.

2. The crossbar of claim 1 wherein said plurality of individual links are connected between nearest neighbors of said switches, and wherein none of said links overlaps any others of said links.

3. The crossbar of claim 1 wherein said controller means comprises means for selecting an exchange state whenever the packets at the switch inputs would not be precluded from reaching their destination output ports by setting the switch to said exchange state.

4. The crossbar of claim 3 wherein said N input ports are those of said link input ends not connected to switches and constituting one end of said crossbar and said N output ports are those of said link output ends not connected to switches and constituting another end of said crossbar.

5. The crossbar of claim 4 wherein said controller means comprises:

means for associating said output ports with a set of consecutive numbers;

means for associating each of said links with the number of the output port in the direct path thereof as a link label;

means for determining a first value equal to the absolute value of the difference between the link label corresponding to the top switch output and the number of the destination output port of a particular packet at an input port of the switch, and a second value equal to the absolute value of the difference between the link label corresponding to the bottom switch output and said number of said destination output port of said particular packet;

first routing means for routing said particular packet to said top switch output if said first value is less than said second value and for routing said particular packet to said bottom switch output if said second value is less than said first value.

6. The crossbar of claim 5 wherein said controller means further comprises:

second routing means for forbidding a switch bypass state if the packet is at the bottom switch input and said destination number is greater than the link label corresponding to the bottom switch output and for forbidding a switch bypass state if the packet is at the top switch input and said destination number is less than the link label corresponding to the top switch input.

7. The crossbar of claim 6 wherein said means for selecting further comprises means for forbidding the exchange state of said switch if packets at said top and bottom switch inputs cause said first and second routing means to select the same switch output for both packets contemporaneously.

8. The crossbar of claim 7 wherein said controller means comprises means for comparing said destination output port number of a packet at each of said top and bottom switch inputs with a predetermined set of numbers prescribed for the particular switch and for generating an up signal upon a match and a down signal otherwise for each of said packets and means for selecting said exchange state unless there are two up signals or two down signals.

9. The crossbar of claim 8 further comprising means for holding each of said switches in one of said exchange and bypass states selected by the controller means thereof while a packet traverses said crossbar.

10. The crossbar of claim 1 wherein said links are characterized by a delay along the lengths thereof and wherein said switches are characterized by a delay therethrough.

11. The crossbar of claim 10 wherein said plurality of links form a planar mesh having top and bottom edges, said crossbar further comprising delay elements each having the same delay as said switches, each delay element connecting a link input end to a link output end at a corresponding edge of said mesh.

12. The crossbar of claim 11 wherein each of said links lies along a diagonal path and wherein said switches and said delay elements lie at points of intersection of different diagonal paths.

13. The crossbar of claim 1 wherein said plurality of links correspond to a cylindrical wrap-around topology.

14. A non-blocking crossbar, comprising at least a pair of cascaded permutation engines, each of said permutation engines comprising an $N \times N$ crossbar for routing packets from a set of N input ports to a set of N output ports, each packet having a header identifying one of said output ports as its destination, comprising:

a plurality of individual links which carry individual packets, each link having a link input end and a link output end;

a plurality of switches, each of said switches having at least top and bottom switch inputs connected to a corresponding pair of said link output ends and top and bottom switch outputs connected to a corresponding pair of link input ends, wherein each switch is connected to four different links and wherein different outputs of each one of at least some of said switches are connected through respective links to inputs of different switches, each of said switches having an exchange state which routes packets from said top and bottom switch inputs to said bottom and top switch outputs, respectively, and a bypass state which routes packets from said top and bottom switch inputs to said top and bottom switch outputs, respectively; and a plurality of individual controller means governing respective ones of said switches for sensing from a header of a packet at each switch input the identity of the destination output port of the packet and selecting one of said exchange and bypass states as a function of the identity of said destination output port and as a function of the location of the corresponding switch relative to said destination output port, wherein the output ports of one of said permutation engines is connected to respective ones of the input ports of the other of said permutation engines.

15. The non-blocking crossbar of claim 14 wherein said plurality of individual links are connected between nearest neighbors of said switches, and wherein none of said links overlaps any others of said links.

16. The non-blocking crossbar of claim 14 wherein said controller means comprises means for selecting an exchange state whenever the packets at the switch inputs would not be precluded from reaching their destination output ports by setting the switch to said exchange state.

17. The non-blocking crossbar of claim 16 wherein said N input ports are those of said link input ends not connected to switches and constituting one end of said crossbar and said N output ports are those of said link output ends not connected to switches and constituting another end of said crossbar.

18. The non-blocking crossbar of claim 17 wherein said controller means comprises:
   means for associating said output ports with a set of consecutive numbers;
   means for associating each of said links with the number of the output port in the direct path thereof as a link label;
   means for determining a first value equal to the absolute value of the difference between the link label corresponding to the top switch output and the number of the destination output port of a particular packet at an input port of the switch, and a second value equal to the absolute value of the difference between the link label corresponding to the bottom switch output and said number of said destination output port of said particular packet;
   first routing means for routing said particular packet to said top switch output if said first value is less than said second value and for routing said particular packet to said bottom switch output if said second value is less than said first value.

19. The non-blocking crossbar of claim 18 wherein one of said permutation engines is inverted with respect to the other wherein said top and bottom switch inputs of one are reversed relative to the other and the numbering of said output ports is reversed relative to the other.

20. The non-blocking crossbar of claim 18 wherein said controller means further comprises:
   second routing means for forbidding a switch bypass state if the packet is at the bottom switch input and said destination number is greater than the link label corresponding to the bottom switch output and for forbidding a switch bypass state if the packet is at the top switch input and said destination number is less than the link label corresponding to the top switch input.

21. The non-blocking crossbar of claim 20 wherein said controller means further comprises means for forbidding the exchange state of said switch if packets at said top and bottom switch inputs cause said first and second routing means to select the same switch output for both packets contemporaneously.

22. The non-blocking crossbar of claim 21 wherein said controller means comprises means for comparing said destination output port number of a packet at each of said top and bottom switch inputs with a predetermined set of numbers prescribed for the particular switch and for generating an up signal upon a match and a down signal otherwise for each of said packets and means for selecting said exchange state unless there are two up signals or two down signals.

23. The crossbar of claim 22 further comprising means for holding each of said switches in one of said exchange and bypass states selected by the controller means thereof while a packet traverses said crossbar.

24. The non-blocking crossbar of claim 14 wherein said links are characterized by a uniform delay along the lengths thereof and wherein said switches are characterized by a uniform delay therethrough.

25. The non-blocking crossbar of claim 24 wherein said plurality of links form a planar mesh having top and bottom edges, said crossbar further comprising delay elements each having the same delay as said switches, each delay element connecting a link input end to a link output end at a corresponding edge of said mesh.

26. The non-blocking crossbar of claim 25 wherein each of said links lies along a diagonal path and wherein said switches and said delay elements lie at points of intersection of different diagonal paths.

27. The non-blocking crossbar of claim 14 wherein said links form a wrap-around topology.

* * * * *